(12) United States Patent
Uzawa et al.

(10) Patent No.: US 7,288,416 B2
(45) Date of Patent: Oct. 30, 2007

(54) IONIC POLYMERS AND POLYMER-COMPRISING SUBSTRATES

(75) Inventors: Hirotaka Uzawa, Ibaraki (JP); Norihiko Minoura, Ibaraki (JP); Hiroki Itou, Ibaraki (JP); Kazuhiro Taguchi, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 325 days.

(21) Appl. No.: 10/851,480

(22) Filed: May 21, 2004

(65) Prior Publication Data

US 2005/0245705 A1    Nov. 3, 2005

(30) Foreign Application Priority Data

May 23, 2003    (JP)    ............................. 2003-145573

(51) Int. Cl.
*G01N 33/548* (2006.01)
*G01N 33/544* (2006.01)
*G01N 33/547* (2006.01)
*G01N 33/53* (2006.01)

(52) U.S. Cl. ............ 436/529; 436/528; 436/532; 436/524; 436/85; 436/823; 435/7.1

(58) Field of Classification Search ........... 436/528, 436/529, 532, 524, 85, 823; 435/7.1; 530/402, 530/403, 812, 813
See application file for complete search history.

(56) References Cited

U.S. PATENT DOCUMENTS 6,231,733 B1    5/2001    Nilsson et al.
6,677,164 B1 *  1/2004    Thoma et al. .............. 436/546
2004/0077595 A1 *  4/2004    Cheng et al. ................ 514/58
2005/0019573 A1 *  1/2005    Kai ............................. 428/403
2005/0180945 A1 *  8/2005    Chaikof et al. .......... 424/78.27

OTHER PUBLICATIONS

Mammen et al., "Polyvalent Interactions in Biological Systems: Implications for Design and Use of Multivalent Ligands and Inhibitors," *Angew. Chem. Int. Ed.*, 37:2754-2794 (1998).

Nishida et al., "A Facile Synthetic Approach to L- and P-Selectin Blockers via Copolymerization of Vinyl Monomers Constructing the Key Carbohydrate Modules of Sialyl Lewis$^x$ Mimics," *Biomacromolecules*, 1:68-74 (2000).

(Continued)

*Primary Examiner*—Long V. Le
*Assistant Examiner*—Shafiqul Haq
(74) *Attorney, Agent, or Firm*—Klarquist Sparkman, LLP

(57) ABSTRACT

An objective of the present invention is to provide ionic polymers that can provide for polymer-comprising substrates whose surfaces can stably and easily immobilize ligands such as sugar chains interacting with biological substances, in which the ligand portion exists stably even in water or buffer, and its detection capability does not decrease for a long period of time; and substrates comprising the polymers.

The ionic polymer of this invention comprises two or more ionic functional groups (A) and two or more biointeracting groups represented by formula L-X-B-[wherein, L denotes a ligand capable of interacting with a biological substance, X denotes a spacer, and B denotes a binding group] as side chains covalently bound to a main chain polymer.

3 Claims, 12 Drawing Sheets

OTHER PUBLICATIONS

Tsen et al., "Development and use of a multiplex PCR system for the rapid screening of heat labile toxin I, heat stable toxin II and shiga-lika toxin I and II genes of *Escherichia coli* in water," *Journal of Applied Microbiology*, 84:585-592 (1998).

Weeratna et al., "Detection and Production of Verotoxin 1 of *Escherichia coli* O157:H7 in Food," *Applied and Environmental Microbiology*, 57:10:2951-2955 (Oct. 1991).

* cited by examiner

IONIC POLYMERS AND POLYMER-COMPRISING SUBSTRATES

PRIORITY CLAIM

This application claims priority from Japanese Patent Application No. 2003-145573, filed May 23, 2003.

FIELD OF THE INVENTION

The present invention relates to novel ionic polymers and polymer-comprising substrates that use these ionic polymers.

BACKGROUND OF THE INVENTION

Pathogenic *E. coli* O-157 are 2 μm long and 1 μm wide rod-shaped bacteria, discovered in the United States in 1982.In Japan, an outbreak of O-157 infection occurred in 1996-1997,leading to a large number of deaths, and becoming a major social problem. This outbreak occurred because discovery of infection was delayed due to the average of seven days between oral infection via food, drinking water, patient excrement and such, the development of symptoms such as diarrhea, and the beginning of treatment. In addition, the toxicity of verotoxin produced by *E. coli* O-157 is several dozen times stronger than that of fugu blowfish. Another reason for this outbreak is that a rapid method for detecting verotoxins has not been fully explored.

Conventionally, known methods for detecting *E. coli* O-157 are based on three principles: antigen-antibody methods, PCR methods, and bioassay methods. Combinations of these methods have also been proposed, and several kits based on these principles are commercially available. In antigen-antibody methods, antigen-antibody reactions are performed on each protein of the six subunits that form one verotoxin, and thus measurements take a long time. In addition, since measurement errors may occur, accurate detection of verotoxins is difficult in certain cases. PCR methods determine the possible existence of verotoxins from *E. coli* gene fragments; verotoxins cannot be detected directly. Bioassay methods allow detection with a certain level of accuracy, however, are problematic in that the procedures are complicated and verotoxin analysis requires approximately three to four days.

Thus, many of the currently known methods for detecting verotoxins only investigate or suggest the existence of *E. coli* cells, requiring time-consuming and laborious analysis, yet yielding unreliable results.

On the other hand, a biosensor in which sugar chains are immobilized on the surface of a substrate such as gold has been proposed as a general biosensor that uses sugar compounds (U.S Pat. No. 6,231,733). This biosensor has a structure in which groups comprising sugar chains bind directly and covalently to a gold surface. In this sensor, low molecular weight compounds such as hydrocarbons are initially bound to sugar chains, thiol groups are bound to the sugar chain portions, and then the sugar chain portions are immobilized onto the substrate by direct covalent bonding or adsorption between the gold surface and the thiol group (SH).

Thiol group-mediated bonds are stable. However, sugar chain derivatives, in contrast to antigens, antibodies, enzymes, and such, comprise many hydroxyl groups, and also have complex three-dimensional structures. Thus introducing thiol groups to the sugar chain portions requires many steps and a great deal of effort. This is problematic in that thiol groups cannot be easily introduced to sugar chains. Alternatively, it is theoretically possible to first introduce groups comprising thiol groups to the gold surface, and then bind separately synthesized sugar chain portions to these. However, the introduction of sugar chain portions to the gold surface in this method is inefficient, and it hence cannot be practically employed.

To bind sugar chain portions comprising thiol groups to a gold surface, a large number of sugar compounds should be produced and immobilized onto a substrate. However, it is generally difficult to uniformly and simultaneously introduce a large amount of sugar chain portions to a gold surface, and thus pinholes may be produced, or alternatively the procedure of the binding reaction must be repeated.

On the other hand, the sugar compound detection reagents previously developed by the present inventors (Unexamined Published Japanese Patent Application (JP-A) No. 2001-342197) comprise sugar chain portions that can recognize and bind to verotoxins, and structures in which hydrocarbon chains are bound to these sugar chains as aglycone portions. The hydrocarbon chains of these aglycone portions are immobilized to a hydrophobically treated substrate by weak bonds, specifically hydrophobic bonds. Therefore, they have poor stability and durability, and the detection reagents can sometimes partially detach from the substrate when immersed for a long time in water or buffer, or when repeatedly used.

In particular, sensor chips to which toxins are bound normally have sugar chains bound via monolayer films. Therefore, when sensor chips are washed after a single use, the sugar compounds immobilized to the substrate surface (JP-A No. 2001-342197) can detach. Thus it is necessary to re-accumulate sugar compounds on to the gold substrate.

After producing monolayer films by this method, the films must be transferred to (or accumulated on) appropriate substrates. However, when transferring and immobilizing a large amount of sugar compound on to a substrate, it is difficult to carry out many treatments at once. Specifically, there is a limit to the process of accumulating a large amount of monolayer film on hydrophobically treated gold surfaces in a short period of time, and thus this process is far from practical.

SUMMARY OF THE INVENTION

The present invention has been made in view of above-described situation in the art. An objective of this invention is to provide ionic polymers that can provide polymer-comprising substrates that bind to biological substances with excellent specificity, very limited nonspecific adsorption, and for long periods of time without losing detection capability, and whose surfaces can stably and easily immobilize ligands, such as sugar chains, capable of interacting with biological substances, and where the ligand portions exist stably even in water or buffers. Another objective of this invention is to provide substrates containing these polymers.

The present inventors carried out exhaustive studies to achieve the above-mentioned objective, and then successfully accomplished the present invention by simply and stably immobilizing ligands to the surface of a substrate by using ionic polymers in which two or more biointeracting groups (each comprising a spacer and a ligand capable of interacting with an organism or a biologically-derived substance (also referred to as a "biological substance")) and ionic functional groups are present as side chains on the main chain of a single polymer, yielding polymer-comprising substrates showing excellent binding to organisms or biologically-derived substances.

[1] An ionic polymer comprising, as side chains, two or more ionic functional groups (A), and two or more biointeracting groups represented by formula L-X-B- (wherein L denotes a ligand capable of interacting with a biological substance; X denotes a spacer; and B denotes a binding group) covalently bound to a main chain polymer.

[2] The ionic polymer of [1], wherein at least two of the ligands L can simultaneously interact with the same biological substance.

[3] The ionic polymer of [1], wherein the main chain polymer comprises a substituted or unsubstituted hydrocarbon backbone or poly-amino-acid-derived backbone, and wherein the average molecular weight of the ionic functional group (A) and the main chain polymer portion is 1,000 to 1,000,000.

[4] The ionic polymer of [1], which comprises a component unit (I) represented by formula (1)

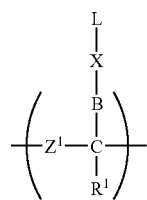
(1)

(wherein L denotes a ligand capable of interacting with a biological substance; X denotes a spacer; B denotes a binding group; $R^1$ denotes a hydrogen atom or an alkyl group comprising one to six carbon atoms; $Z^1$ denotes a substituted or unsubstituted alkylene group whose main chain portion comprises one to eight carbon atoms, a substituted or unsubstituted alkenylene group comprising an unsaturated bond whose main chain portion comprises two to eight carbon atoms, or a —C(=O)NH— group) and a component unit (II) represented by formula (2)

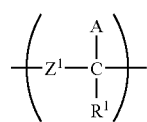
(2)

(wherein A denotes an ionic functional group; and $R^1$ and $Z^1$ both mean the same as in formula (1)) wherein the proportion of the component units (I) and (II) is 1% to 99% and 99% to 1%, respectively, with respect to the sum of the number of moles of the component units (I) and (II).

[5] The ionic polymer of [1], which comprises a component unit (III) represented by formula (3)

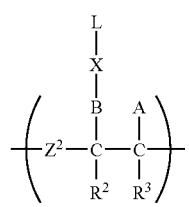
(3)

(wherein L denotes a ligand capable of interacting with a biological substance; X denotes a spacer; B denotes a binding group; A denotes an ionic functional group; each of $R^2$ and $R^3$ may be identical to or different from each other and individually denote a hydrogen atom or an alkyl group comprising one to six carbon atoms; $Z^2$ denotes a substituted or unsubstituted alkylene group whose main chain portion comprises one to eight carbon atoms, or a substituted or unsubstituted alkenylene group comprising an unsaturated bond whose main chain portion comprises two to eight carbon atoms) and/or a component unit (IV) represented by formula (4)

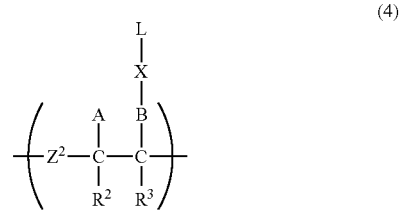
(4)

(wherein, L, X, B, A, $R^2$, $R^3$, and $Z^2$ each mean the same as in formula (3)).

[6] The ionic polymer of [5], which further comprises a component unit (V) represented by formula (5)

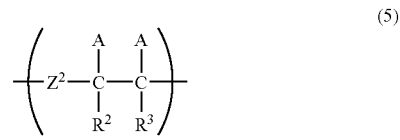
(5)

(wherein A, $R^2$, $R^3$, and Z each mean the same as in formula (3)) wherein the proportion of both component units (III) and (IV) is 1% to 99%, and that of the component unit (V) is 99% to 1%, with respect to the sum of the number of moles of component units (III) to (V).

[7] The ionic polymer of [1], wherein the X comprises a hydrophobic group comprising an alkyl group of two to 30 carbon atoms.

[8] The ionic polymer of [1], wherein the ligand capable of interacting with a biological substance is selected from the group consisting of a protein, glycoprotein, monosaccharide, sugar chain, biotin, intercalator, antigen, antibody, glycolipid, nucleobase, and nucleic acid.

[9] The ionic polymer of [1], wherein the ionic functional group (A) is an anionic functional group or a cationic functional group.

[10] An ionically bound polymer-comprising substrate, which comprises the ionic polymer of [1] and a substrate, wherein the ionic polymer binds to the substrate through two or more ionic bonds, and forms the outermost layer.

[11] The ionically bound polymer-comprising substrate of [10], wherein the ionic polymer ionically binds to the substrate through at least one polyionic polymer membrane.

[12] The ionically bound polymer-comprising substrate of [11], wherein the polyionic polymer membrane is a layer-by-layer film produced by alternating a polycationic polymer membrane and polyanionic polymer membrane.

[13] A covalently bound polymer-comprising substrate, wherein two or more ionic functional groups (A) in the ionic polymer of [1] covalently bind to two or more functional groups on the substrate.

[14] The ionic polymer of [1], which is an ionic polymer for detecting a biological substance.

[15] The substrate of [10], which is a substrate for detecting a biological substance.

[16] A sensor for detecting a biological substance, which comprises the substrate of [10].

[17] A reagent for detecting a biological substance, which comprises the ionic polymer of [1].

[18] A method for detecting a biological substance, which comprises the steps of:

(1) contacting a test compound with the substrate of [10]; and (2) detecting the biological substance bound to the substrate.

Figure 1:
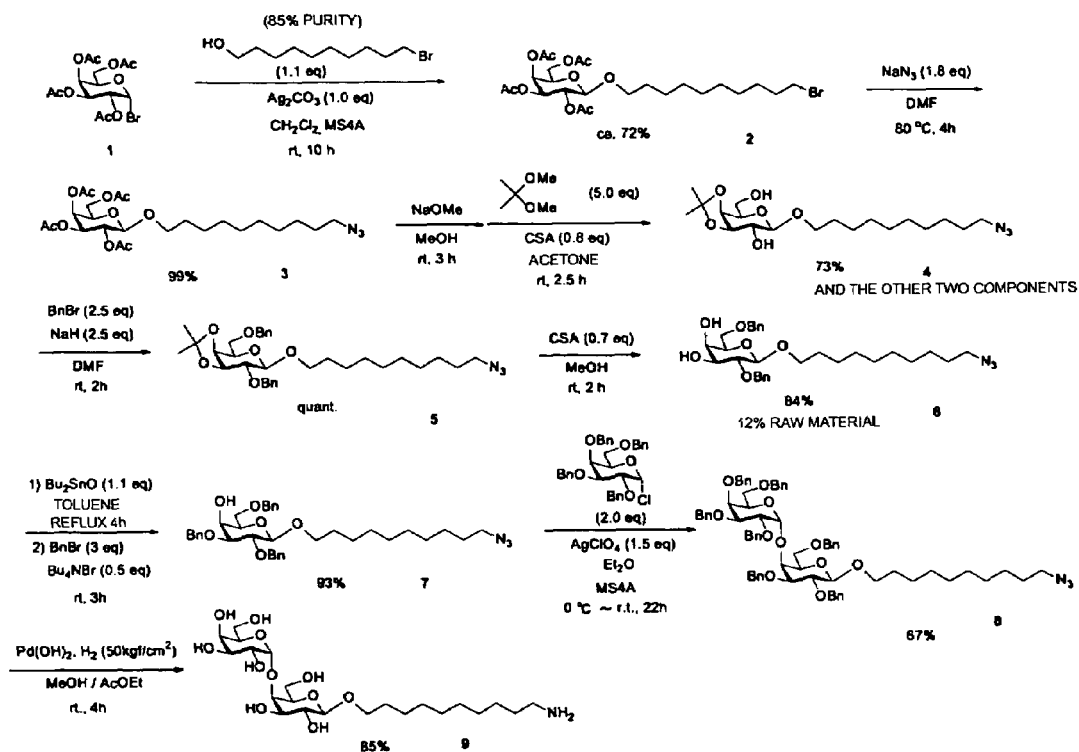
FIG. 1 is a scheme showing an example of a method for producing the biointeracting groups.

Specific examples of the biological substances to be interacted are toxins, viruses, bacteria, microorganisms, cells, proteins, and DNAs.

For example, when the biological substance is *E. coli* O-157 or a verotoxin produced by *E. coli* O-157, disaccharide units (Galα1-4Galβ1-O—) represented by formula (6) in which two galactoses are α-bonded to each other:

[Structure (6)]

or trisaccharide units (Galα1-4Galβ1-4Glcβ1-O—) represented by formula (7) in which a glucose is bound to the two galactoses α-bonded to each other:

[Structure (7)]

can be preferably used as ligands L.

When the ligands L of the ionic polymers of the present invention can easily bind to pathogenic bacteria (such as *E. coli* O-157), or to toxins produced by the bacteria (such as verotoxins), they can bind to or capture such bacteria or toxins very specifically and effectively. Therefore, the polymers can be effectively used for qualitative and quantitative bacteria or toxin analyses.

For example, the disaccharide structure shown in formula (6) is the minimum required unit that recognizes verotoxin, and can detect verotoxins accurately since it only comprises a structural unit in which two galactoses are α-bonded, and nearly precludes reaction with other so-called interferent materials (contaminants).

On the other hand, in sugar chains with the trisaccharide structure of formula (7), the disaccharide at the reducing end has a so-called lactose structure. Since this lactose structure reacts (crosses) with not only verotoxins but also with many in vivo proteins, verotoxin selectivity (specificity) may be reduced. However, judging from similarities in sugar chain structures present in vivo, verotoxin binding is stronger than that of disaccharide compounds.

Therefore, ligands for detecting verotoxins are preferably selected by adequately considering their accuracy and rapidity so that the characteristics of each compound will be sufficiently exerted.

Furthermore, when the toxin is botulinum toxin B, produced by *Clostridium botulinum*, L is exemplarily a heptasaccharide ligand represented by formula (8).

[Structure (8)]

(Spacer: X)

X is a spacer, and binds L to the main polymer chain through binding group B by leaving a certain amount of space. When using a polymer-comprising substrate in an aqueous solution (buffer), and when the ionic functional group (A) is bound by an electrostatic bond (ionic bond) to a corresponding oppositely charged ionic polymer or substrate surface, the spacer preferably has a hydrophobic structure in order to decrease contacting the ionic bond portion with water and ionic substances dissolved in water (such as salts in the buffer), and to suppress peel of the ionic polymer itself. On the other hand, in the process of preparing the biointeracting groups, ligand L capable of interacting with a biological substance is often immobilized in aqueous solution, and therefore solubility of ligand L in water may by necessary to maintain convenience of the operation.

Therefore, the spacer X desirably comprises, for example, a linear alkyl group preferably comprising two to 30 carbon atoms, more preferably six to 20, and especially preferably eight to 15.

For example, when the interacting biological substances are O-157 or verotoxins produced by O-157, spacer X is desirably a linear alkylene group comprising preferably six to 20 carbon atoms, and more preferably eight to twelve carbon atoms.

To date, for example, the aglycone portions of the sugar compounds have been used only for immobilization to substrates by hydrophobic interactions. However, when applying this invention to O-157 or verotoxins, binding of O-157 or verotoxins to a ligand L can be enhanced when the spacer portion forms a hydrophobic structure with a number of carbon atoms in the above-indicated range.

Furthermore, when the interacting biological substances are toxins produced by *Clostridium botulinum*, for example, spacer X preferably comprises a linear alkylene group of preferably six to 20 carbon atoms, and more preferably ten to 15 carbon atoms. An example of a group comprising an alkylene group of 13 carbon atoms is the group represented by formula (9):

$$\text{(9)}$$

wherein L denotes a ligand, and B denotes a group that binds to the polymer.

(Binding Group: B)

B is a binding group and corresponds to the binding portion between the polymer main chain and the biointeracting group.

Examples of such binding groups include:

amide bonds such as —NH—CO-(polymer), —CO—NH-(polymer), —NH—CO—R-(polymer), and —CO—NH—R-(polymer);

sulfonamide bonds such as —NH—SO$_2$-(polymer), —SO$_2$—NH-(polymer), —NH—SO$_2$—R-(polymer), and —SO$_2$—N—R-(polymer); and Schiff bases such as —CH=N-(polymer) and —N=CH-(polymer), or —CH$_2$—NH-(polymer) and —NH—CH$_2$-(polymer) produced by reducing the Schiff bases with NaBH$_3$CN, BH$_3$NHMe$_2$, Pd-HCOOH, and such.

In addition, a urea bond —NH—CO—NH-(polymer), ester bond —O—CO-(polymer), urethane bond —O—CO—NH-(polymer), —S—CO—NH-(polymer), —NH—CS—NH-(polymer), and —NH—C$_3$N$_3$Cl (1,3,5-triazine backbone)-NH-(polymer) can be used.

Herein, the aforementioned "—C$_3$N$_3$Cl" portion is referred to as a 1,3,5-triazine backbone.

The above-mentioned urea bond and urethane bond can be prepared from (polymer)-N=C=O, and —S—CO—NH-(polymer) and —NH—CS—NH-(polymer) can be prepared from (polymer)-N=C=S.

For —NH—C$_3$N$_3$Cl (1,3,5-triazine backbone)-NH-(polymer), the reaction can be performed under basic conditions that involve, for example, triethyl amine or sodium hydroxide.

Esters, amide bonds, sulfonamide bonds, and such can be formed according to methods for forming amide bonds, described below.

Herein, "—R—" indicates that an additional group may exist between the polymer main chain and these amide bonds, sulfonamide bonds, or such. Examples of R groups are alkylene groups of one to six carbon atoms, phenylene groups, and ethyleneoxy groups ((C$_2$H$_4$O)$_n$).

Furthermore, the aforementioned "-(polymer)" indicates that the binding group is bound to the main chain polymer.

Ionic Functional Group (A)

An example of ionic functional group (A) is an anionic functional group or a cationic functional group.

Examples of anionic functional groups are —CO$_2^-$ (carboxylate group), —SO$_3^-$ (sulfonate group), —OSO$_3^-$ (sulfate group), —OPO$_4^-$ (phosphate group), and —B(OH)$_2$ (borate group). Such anionic functional groups may bind to metal cations or organic cations.

Examples of metal cations are alkali metals such as Na$^+$ (sodium cation), K$^+$ (potassium cation), and Ca$^+$ (calcium cation). Examples of organic cations are Me$_3$N$^+$H (trimethyl ammonium cation), Et$_3$N$^+$H (triethyl ammonium cation), and Me$_2$N$^+$H$_2$ (dimethyl ammonium cation).

Examples of cationic functional groups are guanidinium ion, —NH$_3^+$, —NH$_2$(CH$_3$)$^+$, —NH(CH$_3$)$_2^+$, and —N(CH$_3$)$_3^+$. A cat group may also comprise a group represented by the following formula:

Such cationic functional groups may form salts by binding to halogen anions, such as chloride and bromide, sulfate anions, sulfonate anions, phosphate anions, or carboxylate anions.

Of these, —CO$_2^-$ and —SO$_3^-$ may be preferably used as anionic functional groups. As cationic functional groups, preferably used groups are —NH$_3^+$, —N(CH$_3$)$_3^+$, and the following formula:

and more preferably, —N(CH$_3$)$_3^+$ which is a quaternary ammonium ion and a group comprising the following structure:

Such an ionic functional group (A) may be directly bound to a main chain polymer, or, for example, it may be bound to a polymer main chain via another binding group R (for example, A—R-polymer main chain).

Examples of binding group —R— include alkylene groups of one to six carbon atoms, phenylene groups, and ethyleneoxy groups ((C$_2$H$_4$O)$_n$).

Such ionic functional groups are readily introduced, and easily converted, and can form stronger bonds with polyionic polymer membranes.

Without limitation, the type of ionic functional group is determined according to combination with the type of ionic functional group of the polyionic polymer membrane on the substrate, or ease of conversion to a binding group that can bind to the biointeracting group, and such.

A functional group originally present in the main chain polymer can be used in its original form as this kind of ionic functional group, or can be derived for use as an ionic functional group.

Ionic Polymer

The ionic polymer of this invention comprises two or more biointeracting groups and two or more ionic functional groups (A). These ionic polymers can be formed by binding a biointeracting compound, which induces the biointeracting group, with a polymer that comprises ionic functional groups (hereinafter, such polymers may be referred to as "raw polymers").

(Raw Polymers)

The above-mentioned raw polymers should comprise two or more ionic functional groups, and the main chain polymer is not particularly limited.

Polymers comprising, for example, a substituted or unsubstituted hydrocarbon backbone, or a polyamino acid-derived backbone are preferable for use, considering ease of availability.

Examples of such polymers comprising a substituted or unsubstituted hydrocarbon backbone or a polyamino acid-derived backbone are those comprising component units (I) and (II), represented by the following formulae (1) and (2) respectively:

Component unit (I) is represented by:

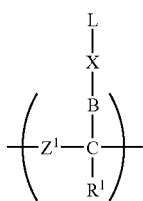

(1)

Component unit (II) is represented by:

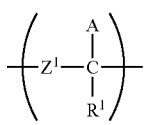

(2)

In formula (1), L, X, and B mean the same as in the aforementioned group L capable of interacting with biological substances, spacer X, and binding group B, respectively.

$R^1$ is preferably a hydrogen atom or an alkyl group of one to six carbon atoms. Of the alkyl groups of one to six carbon atoms, alkyl groups of one or two carbon atoms (methyl group or ethyl group) are more preferably used.

Herein, $R^1$ is preferably a hydrogen atom. The small molecular diameter of $R^1$ can reduce steric hindrance during ionic binding of the ionic functional group to the substrate.

Examples of $Z^1$ are preferably substituted or unsubstituted alkylene groups whose main chain portions may comprise one to eight carbon atoms, substituted or unsubstituted alkenylene groups comprising an unsaturated bond whose main chain portions may comprise two to eight carbon atoms, or groups represented by —C(=O)NH—.

Herein, an alkylene group refers to a divalent group derived by further removing any one hydrogen atom from an alkyl group. Specific examples of an alkylene group whose main chain comprises one to eight carbon atoms are methylene groups, 1,2-ethylene groups, 1,1-ethylene groups, 1,3-propylene groups, tetramethylene groups, pentamethylene groups, and hexamethylene groups, and more preferably an alkylene group (methylene group or ethylene group) whose main chain portion comprises one or two carbon atoms, and still more preferably methylene groups.

Furthermore, when the alkylene group comprises a substituent, the substituent may be, for example, an alkyl group of one to 15 carbon atoms, preferably one to six carbon atoms, or still more preferably an alkyl group of one or two carbon atoms; an alkoxy group of one to six carbon atoms, or preferably an alkoxy group of one or two carbon atoms; or an aryl group of six to ten carbon atoms.

Specifically, the alkyl group of one to 15 carbon atoms refers to a linear or branched alkyl group comprising one to 15 carbons, which is a monovalent group derived from an aliphatic hydrocarbon comprising one to 15 carbons by removing any one hydrogen atom. Specific examples of alkyl groups of one to 15 carbon atoms comprise alkyl groups of one to six carbon atoms such as a methyl group, ethyl group, 1-propyl group, 2-propyl group, 2-methyl-1-propyl group, 2-methyl-2-propyl group, 1-butyl group, 2-butyl group, 1-pentyl group, 2-pentyl group, 3-pentyl group, 2-methyl-1-butyl group, 3-methyl-1-butyl group, 2-methyl-2-butyl group, 3-methyl-2-butyl group, 2,2-dimethyl-1-propyl group, 1-hexyl group, 2-hexyl group, 3-hexyl group, 2-methyl-1-pentyl group, 3-methyl-1-pentyl group, 4-methyl-1-pentyl group, 2-methyl-2-pentyl group, 3-methyl-2-pentyl group, 4-methyl-2-pentyl group, 2-methyl-3-pentyl group, 3-methyl-3-pentyl group, 2,3-dimethyl-1-butyl group, 3,3-dimethyl-1-butyl group, 2,2-dimethyl-1-butyl group, 2-ethyl-1-butyl group, 3,3-dimethyl-2-butyl group, and 2,3-dimethyl-2-butyl group, and furthermore a heptyl group, octane group, nonane group, decane group, and tetradecane group.

An alkyloxy group of one to six carbon atoms refers to, for example, an oxy group to which the $C_{1-6}$ alkyl group is bound, and specific examples comprise a methoxy group, ethoxy group, 1-propyloxy group, 2-propyloxy group, 2-methyl-1-propyloxy group, 2-methyl-2-propyloxy group, 1-butyloxy group, 2-butyloxy group, 1-pentyloxy group, 2-pentyloxy group, 3-pentyloxy group, 2-methyl-1-butyloxy group, 3-methyl-1-butyloxy group, 2-methyl-2-butyloxy group, 3-methyl-2-butyloxy group, 2,2-dimethyl-1-propyloxy group, 1-hexyloxy group, 2-hexyloxy group, 3-hexyloxy group, 2-methyl-1-pentyloxy group, 3-methyl-1-pentyloxy group, 4-methyl-1-pentyloxy group, 2-methyl-2-pentyloxy group, 3-methyl-2-pentyloxy group, 4-methyl-2-pentyloxy group, 2-methyl-3-pentyloxy group, 3-methyl-3-pentyloxy group, 2,3-dimethyl-1-butyloxy group, 3,3-dimethyl-1-butyloxy group, 2,2-dimethyl-1-butyloxy group, 2-ethyl-1-butyloxy group, 3,3-dimethyl-2-butyloxy group, and 2,3-dimethyl-2-butyloxy group.

An aryl group of six to ten carbon atoms refers to an aromatic cyclic hydrocarbon group of six to ten carbons, and specific examples are a phenyl group, tosyl group, 1-naphthyl group, and 2-naphthyl group.

Furthermore, examples of a substituted or unsubstituted alkenylene group comprising an unsaturated bond whose main chain portion comprises two to eight carbon atoms are an alkenylene group of four to eight carbon atoms, which comprises one double bond, and a diene of four to eight carbon atoms. It may also comprise an α,β-unsaturated carbonyl structure.

The alkenylene group is a group in which at least one of the single bonds of the alkylene group is replaced with a double bond, and in which the double bond may exist either at the end or within the main chain.

When the alkenylene group comprises a substituent, the substituent is, for example, an alkyl group of one to 15 carbon atoms, preferably one to six carbon atoms, more preferably an alkyl group of one or two carbon atoms; an alkoxy group of one to six carbon atoms, or preferably an alkoxy group of one or two carbon atoms; or an aryl group of six to ten carbon atoms, and specific examples comprise the same substituents as those of the aforementioned alkylene group.

When the number of carbon atoms of $Z^1$ increases, hydrophobicity also increases. Therefore, in this case, when the biointeracting group is bound to the main chain polymer in an aqueous solution, the solubility of the main chain polymer decreases, and the efficiency of the binding reaction may also decrease.

Also, the biointeracting group may be bound to the raw polymer in solvents other than water, such as N,N-dimethylformamide (DMF) and dimethylsulfoxide (DMSO), or in a mixture of water and these two types of solvents. The biointeracting group may be protected by a protective group of a hydroxyl group with an ester (acetyl group, benzoyl group, etc.), by a protective group of a hydroxyl group with an ether (benzyl group, trityl group, etc.), or by a protective group of two hydroxyl groups with an acetal (isopropylidene group, benzylidene group, etc.), or it may be partially protected, or may not be protected. When biointeracting groups are not protected, aqueous solvents are preferably used, but organic solvents such as DMF and DMSO may also be used. When biointeracting groups are protected, solubility problems make the use of aqueous solvents difficult.

In formula (2), A has the same meaning as the ionic functional group (A). $R^1$ and $Z^1$ have the same meanings as $R^1$ and $Z^1$, respectively, in formula (1).

Such an ionic polymer comprising component units (I) and (II), in which ionic functional groups (A) and biointeracting groups are present as side chains on the polymer main chain, can be obtained, for example, by binding the biointeracting groups to some of the ionic functional groups in the main chain polymer and retaining the ionic functional groups that did not bind to the biointeracting groups as they are.

The relative content of such component units (I) and (II) is not limited and differs depending on the type of biological substance to be detected, the type of ligand L, and the density of ionic functional groups in the polyionic polymer membrane on a substrate.

The composition ratios of the component units with respect to the sum of the number of moles of component units (I) and (II) are preferably 10% to 95% for component unit (I) and 5% to 90% for component unit (II), and more preferably 25% to 75% for component unit (I) and 75% to 25% for component unit (II).

The introduction ratio can be controlled by appropriately adjusting the molar equivalent of the biointeracting compound that induces the biointeracting group, which is contacted to the raw polymer.

The sequence of component units (I) and (II) is not limited and can be, for example, random, alternating, or block state, or combinations thereof.

The ionic polymers of the present invention further include polymers comprising component units (III) and/or (IV), represented by the following formulae (3) and/or (4), respectively. The ionic polymers may also comprise component unit (V), represented by formula (5) as shown below.

Component unit (III) is represented by:

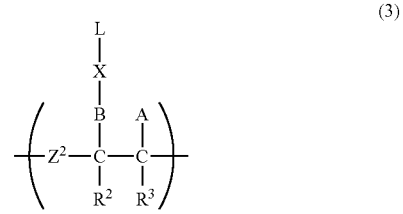

(3)

Component unit (IV) is represented by:

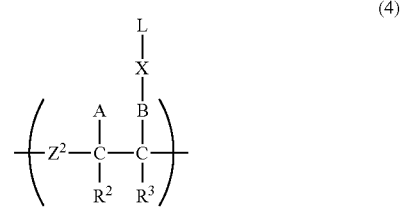

(4)

Component unit (V) is represented by:

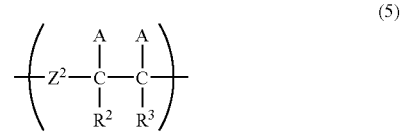

(5)

L, X, B, and A in formulae (3) and (4) mean the same as the aforementioned group L which can interact with biological substances, spacer X, binding group B, and ionic functional group A, respectively.

$R^2$ and $R^3$ may be identical to or different from each other, and preferably denote a hydrogen atom, or an alkyl group of one to six carbon atoms, of which alkyl groups with one or two carbon atoms (methyl or ethyl groups) are more preferable.

Preferably, $R^2$ and $R^3$ are both hydrogen atoms. The small molecular diameters of $R^2$ and $R^3$ can reduce steric hindrance during ionic binding of the ionic functional groups to the substrates.

$Z^2$ is preferably a group represented by a substituted or unsubstituted alkylene group whose main chain portion may comprise one to eight carbon atoms, or a substituted or unsubstituted alkenylene group comprising an unsaturated bond whose main chain portion may comprise two to eight carbon atoms.

The substituted or unsubstituted alkylene group whose main chain portion comprises one to eight carbon atoms is, for example, preferably an alkylene group (methylene group or ethylene group) whose main chain portion has one or two carbon atoms, and more preferably a methylene group.

When the alkylene group comprises a substituent, the substituent may be, for example, an alkyl group of one to 15 carbon atoms, preferably one to six carbon atoms, or more preferably one or two carbon atoms; an alkoxy group of one to six carbon atoms, preferably an alkoxy group of one or two carbon atoms; or an aryl group of six to ten carbon atoms. Specific examples of the substituent are the same as those of $Z^1$.

Furthermore, the substituted or unsubstituted alkenylene group comprising an unsaturated bond whose main chain comprises two to eight carbon atoms is, for example, an alkenylene group of four to eight carbon atoms comprising one double bond, or a diene of four to eight carbon atoms. It may also comprise an $\alpha,\beta$-unsaturated carbonyl structure.

The alkenylene group is a group in which at least one single bond of an alkylene group is replaced with a double bond, and the double bond may exist either at the end or within the main chain.

Furthermore, when the alkenylene group comprises a substituent, the substituent is, for example, an alkyl group of one to 15 carbon atoms, preferably one to six carbon atoms, and more preferably one or two carbon atoms; an alkoxy group of one to six carbon atoms, preferably an alkoxy group of one or two carbon atoms; or an aryl group of six to ten carbon atoms. Specific examples of the substituent are the same as those of $Z^1$.

When binding the biointeracting group to the polymer main chain in an aqueous solution, if $Z^2$ is larger and hydrophobicity increases, the solubility of the polymer main chain decreases and the efficiency of the binding reaction may decrease.

Also, the biointeracting group may be bound to the raw polymer in solvents other than water, such as N,N-dimethylformamide (DMF) and dimethylsulfoxide (DMSO), or in a mixture of water and these two types of solvents. The biointeracting group may be protected by a protective group of a hydroxyl group with an ester (acetyl group, benzoyl group, etc.), by a protective group of a hydroxyl group with an ether (benzyl group, trityl group, etc.), or by a protective group of two hydroxyl groups with an acetal (isopropylidene group, benzylidene group, etc.), or it may be partially protected, or may not be protected. When biointeracting groups are not protected, aqueous solvents are preferably used, but organic solvents such as DMF and DMSO may also be used. When biointeracting groups are protected, solubility problems make the use of aqueous solvents difficult.

In formula (5), A has the same meaning as the ionic functional group (A). $R^2$, $R^3$, and $Z^2$ mean the same as $R^2$, $R^3$, and $Z^2$, respectively, in formulae (3) and (4).

Such an ionic polymer comprising component units (III) and (IV) can be obtained, for example, by binding the biointeracting groups to some of the ionic functional groups in the main chain polymer and retaining the ionic functional groups that did not bind to the biointeracting groups as they are.

The relative contents of such component units (III) and (IV), and if necessary (V), are not limited, and differ depending on the type of biological substance to be detected, type of ligand L, and the density of ionic functional groups in the polyionic polymer membrane on a substrate.

When component unit (V) is included, the relative composition of the component units with respect to the sum of the number of moles of component units (III) to (V) is preferably 10% to 95% for the sum of component units (III) and (IV) and 5% to 90% for component unit (V), and more preferably 25% to 75% for the sum of component units (III) and (IV) and 75% to 25% for component unit (V).

The introduction ratio can be controlled by appropriately adjusting the molar equivalent of the biointeracting compound that induces the biointeracting group, which is contacted to the raw polymer.

The sequences of component units (III) and/or (IV), and component unit (V) are not limited and can be, for example, random, alternating, block state, or combinations thereof.

Depending on the amount of ligand L that can be accepted by the biological substance that may interact, when a plurality of ligands L can bind to one biological substance, preferably at least two ligands L are bound to the main chain polymer at an interval allowing simultaneous interaction to occur with the same biological substance. Therefore, at least two component units (I) (or (III) or (IV)) are preferably arranged at an interval allowing simultaneous interaction with the same biological substance.

When two or more of ligands L that exist on the main chain of a single polymer bind simultaneously to a biological substance, a synergistic effect, also called a multivalency effect or cluster effect, occurs (Mammen, M., Choi, S. K., and Whitesides, G. M., *Angew. Chem. Int. Ed*. 1998, 37, 2754-2794).

Normally, this effect increases the level of interaction to ten to 100,000 times that of the monomer. Therefore, compared with cases where ligand L is bound to a monomer, the binding of ligand L to the biological substance is enhanced. When the ionic polymer is applied to a sensor, extremely highly sensitive detection of biological substances becomes possible.

Producing a space on the main chain polymer for at least two ligands L, such that simultaneous interaction with the same biological substance is possible, means designing and synthesizing a molecule that corresponds to the ligand binding site of the biological substance every time, but if a portion of ligand L incorporated into the main chain polymer (including 1% to 100%, preferably 3% to 90% of ligand L with respect to the entire polymer) interacts by chance with the ligand binding site of a biological substance (for example, a receptor protein), the biological substance can bind to the ionic polymer comprising the ligands L. Therefore, by providing an ionic polymer comprising the aforementioned components (III), (IV), and (V) in an unrestricted order, which may be random, alternating, block state, or combinations thereof, biological substances can be adequately captured. An ionic polymer comprising tailor-made ligands L does not have to be synthesized. Furthermore, since the probability of interacting with a biological substance increases when the mole ratio of ligand L is increased, the content of ligand L may be increased.

Specific examples of such component units (I) and (II), component units (III) and/or (VI), and (V) are shown below.

Examples of the ionic polymers comprising component units (I) and (II) and comprising sugar chains as ligands are the formulae (10) to (13), shown below:

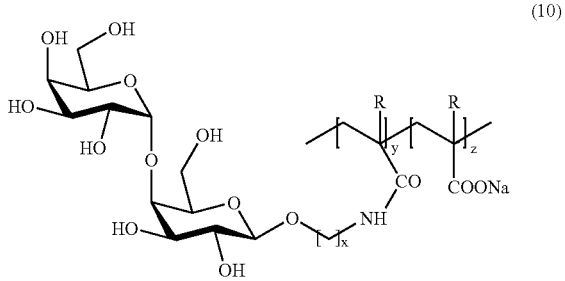

(10)

-continued

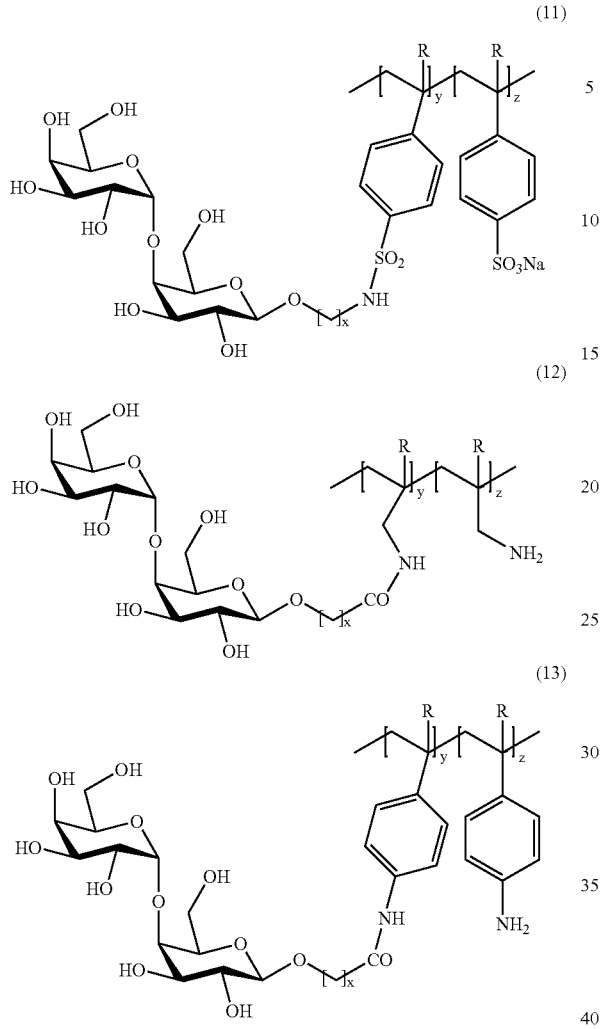

The sugar chains (disaccharides) indicated in the aforementioned (10) to (13) may be the trisaccharides shown in the aforementioned formula (7), and can also be used as ligands for *E. coli* O-157 and verotoxin produced thereby.

In formulae (10) to (13), X is preferably an integer of 6 to 20, or more preferably 8 to 12. Y and Z denote individually integers of 5 to 5,000. R represents a hydrogen atom or an alkyl group of one to six carbon atoms. Each of the component units may exist in a random, alternating, or block state. They can be preferably used as ligands for O-157 and verotoxin.

The ionic polymer comprising component units (III) and/or (VI), and if necessary component unit (V), is, for example, a polymer comprising component units represented by formulae (14) and/or (15), and (16).

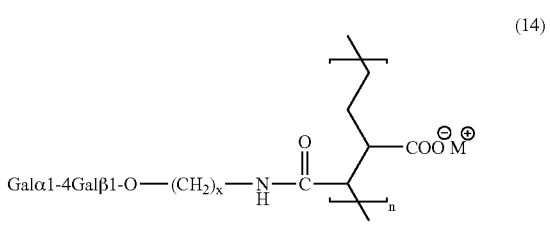

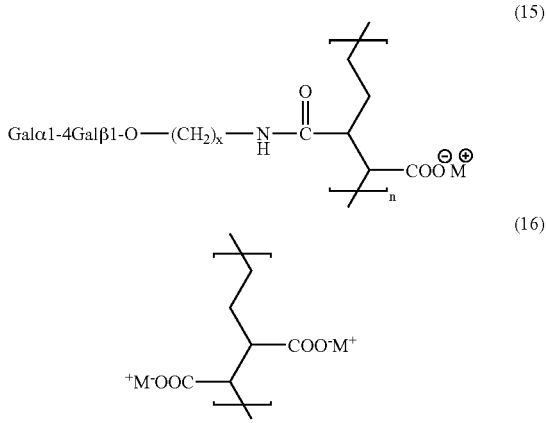

In formulae (14) and (15), Galα1-4Galβ1-O— represents a disaccharide unit in which two galactoses are α-bonded as indicated above in formula (6). Furthermore, X denotes an integer of preferably 6 to 20, and more preferably 8 to 12. M denotes a metal cation or organic cation such as $Na^+$, $K^+$, and $Me_3N^+H$. These can be preferably used as ligands for O-157 and verotoxin.

(Production of the Main-chain Polymer)

Although the ionic polymer of the present invention comprises two or more biointeracting groups and two or more ionic functional groups (A) as side chains, normally, biointeracting groups can be introduced by binding to the ionic functional groups present in the raw polymer. The raw polymers are exemplarily polymers comprising a substituted or unsubstituted carbon backbone or a polyamino acid-derived backbone.

Therefore, the raw polymer may originally comprise preferably at least four or more ionic functional groups, or may comprise four or more ionic functional groups formed by functional group interconversions.

Such raw polymers may be commercially available polymers, or can be obtained, for example, by (co-)polymerizing monomers comprising ionic functional groups or monomers capable of inducing ionic functional groups.

Examples of such monomers are monomers comprising an ionic functional group or a group capable of inducing an ionic functional group, such as those comprising a vinyl group, allyl group, or diene.

More specifically, examples of such monomers are: amides such as (meth)acrylamide;

carboxylic acids or esters thereof such as (meth)acrylic acid, or vinyl formate, vinyl acetate, allyl acetate, allyl acetoacetate, or vinyl maleate;

sulfonic acids or esters thereof such as styrene sulfonic acid or styrene sulfonic acid ester; and in addition, sulfuric acid esters, phosphoric acid esters, and phosphonic acid esters.

Polymerization of monomers can be performed by conventional methods, for example, by polymerizing the monomers in the presence or absence of solvent, with a polymerization-initiating agent if necessary.

Without limitation, solvents should be those that dissolve the monomer. For example, THF, methanol, DMF, and DMSO may be used.

As the polymerization initiating agent, 2,2'-azobis(isobutyronitrile) (AIBN), 1,1'-azobis(cyclohexane-1-carbonitrile), 2,2'-azobis(2-methylbutyronitrile), and such may be used. In addition to these, azo compounds, peroxides, organometallic compounds, and such may be used.

When using monomers that do not dissolve in the above-described solvents such as THF, polymerization is performed, for example, by using ultrapure water as a solvent, and using a polymerization-initiating agent such as N,N,N',N'-tetramethylethylenediamine or 4,4'-azobiscyanovaleric acid.

The polymerization procedure is not limited and differs depending on the type of monomer, but is conventionally performed, for example, at a temperature range of room temperature to approximately 100° C., for one to 72 hours.

Furthermore, polyamino acids comprising carboxylic acids, such as polyaspartic acid and polyglutamic acid, which are condensates of aspartic acid and glutamic acid respectively, and polyamino acids comprising amino groups on their side chains, such as polylysine, may be used.

Such condensates may be commercially available, or may be synthesized by standard methods.

Furthermore, ethylene-based maleic anhydride derivatives represented by formula (17) may be used as the polymer:

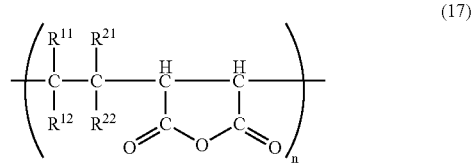

(17)

In formula (17), n is preferably an integer of 5 to 10,000. $R^{11}$, $R^{12}$, $R^{21}$, and $R^{22}$ each independently denote a hydrogen atom, an alkyl group of one to 15 carbon atoms, an alkyloxy group of one to six carbon atoms, or an aryl group of six to ten carbon atoms.

$R^{11}$, $R^{12}$, $R^{21}$, and $R^{22}$ correspond to the substituents when $Z^1$ and $Z^2$ of the formulae (1), (2), (3), and (4) are methylene groups.

Desirable alkyl groups of one to 15 carbon atoms are preferably alkyl groups of one to six carbon atoms, and more preferably alkyl groups of one or two carbon atoms. Desirable alkoxy groups of one to six carbon atoms are preferably alkoxy groups of one or two carbon atoms. Specific examples of such alkyl groups, alkyloxy groups, and aryl groups are the same groups as the substituents described as examples for the aforementioned $Z^1$ or $Z^2$.

Among them, more specifically, for example, a raw polymer comprising a repeating unit can be preferably used, in which $R^{11}$, $R^{12}$, $R^{21}$, and $R^{22}$ are all hydrogen atoms; or $R^{11}$ and $R^{12}$ are both hydrogen atoms, and $R^{21}$ and $R^{22}$ are both methyl groups; or $R^{11}$ is a hydrogen atom, $R^{12}$ is tetradecene, and $R^{21}$ and $R^{22}$ are both hydrogen atoms; or $R^{11}$, $R^{12}$, and $R^{21}$ are hydrogen atoms, and $R^{22}$ is an alkoxy group such as a methoxy group or an aryl group such as a phenyl group.

Of these, a preferred repeating unit is represented by formula (18) in which $R^{11}$, $R^{12}$, $R^{21}$, and $R^{22}$ are all hydrogen atoms:

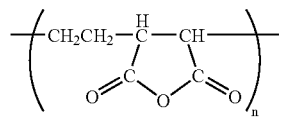

(18)

By using these ethylene-based maleic anhydride derivatives, when a monomer that induces a biointeracting group comprises an amino group, an amide bond can be formed, causing the biointeracting group to be easily bound to the polymer, and a carboxyl group can be created as the ionic functional group (A).

Such ethylene-based maleic anhydride derivatives can be used preferably for the production of ionic polymers for detecting O-157 or verotoxins.

Among these ethylene-based maleic anhydride derivatives, poly(ethylene-alt-maleic anhydride), poly(isobutyrene-alt-maleic anhydride), poly(butadiene-alt-maleic anhydride), poly(maleic anhydride-alt-1-tetradecene) ("alt" means alternating repeat pattern), and such are commercially available, or may be synthesized by conventional methods.

In such polymers, up to one biointeracting group is bound to each of the anhydride portions; therefore, the introduction efficiency of the biointeracting group is up to 50%.

The average molecular weight of the main chain polymer portion and the ionic functional group (A) used in this invention is preferably in the range of 1,000 to 1,000,000, and more preferably 100,000 to 500,000.

(Method for Producing Biointeracting Compounds)

The biointeracting group comprises ligand L, spacer X, and binding group B. The biointeracting compound that induces such biointeracting groups is normally synthesized by linking a spacer comprising a functional group to ligand L using any method. Next, this biointeracting compound is introduced into the polymer main chain by any method.

As an example, a method for producing a biointeracting compound in which ligand L is a sugar chain is described below. Specifically, the method for producing the biointeracting compound (Galα1-4Galβ1-O—(CH$_2$)$_{10}$—NH$_2$) (compound 9 in FIG. 1) when x is 10 in the aforementioned formulae (14) and (15) will be described by referring to FIG. 1.

Commercially available 1-bromo-10-decanol and commercially available acetobromogalactopyranoside 1 were reacted in a solvent in the presence of a promoter such as silver carbonate (Ag$_2$CO$_3$), silver perchlorate (AgClO$_4$), or silver triflate (AgOTf) to obtain compound 2 (galactose derivative) in which an alkyl chain is introduced selectively to the aglycone portion on position 1 of the sugar. Methylene chloride, chloroform, toluene, and such may be used preferably as solvents. Among them, methylene chloride is used more preferably from the standpoint of solubility. Molecular sieves may be added to the reaction system as a drying agent.

When using trimethylsilyl triflate (TMSOTf) or trifluoroborane diethyl ether (BF$_3$Et$_2$O) as promoters, the commercially available pentaacetyl galactopyranoside or 2,3,4,6-O-tetraacetyl galactopyranosyl trichloroimidate derivative may be used instead of raw material 1. Either case yields compound 2.

When using TMSOTf and BF$_3$Et$_2$O, the reaction is performed at −80° C. to 30° C., and preferably at −30° C. to 10° C. When using silver carbonate, silver perchlorate, or silver triflate, the reaction is performed preferably at −10° C. to room temperature (20° C. to 30° C.).

Furthermore, the amount of monoalcohol to be used for the raw sugar compound is preferably in the range of 1.0 molar equivalent to 10 molar equivalents, and more preferably in the range of 1.1 to 1.5 molar equivalents. The reaction time is preferably one hour to one week, more preferably five hours to 48 hours, and most preferably approximately 20 hours.

Next, the aforementioned compound 2 is dissolved in dry dimethylformamide (DMF), and then sodium azide is added to introduce the azide group, converting to compound 3 (the azide derivative).

Nucleophilic reagents such as crown ethers and hexaphosphoric triamide may also be added. The reaction temperature is preferably room temperature to 140° C., and more preferably 80° C. to 110° C. The reaction time is preferably five minutes to five days, more preferably three hours to 48 hours.

Compound 3 is treated with sodium methylate in methanol, sodium hydroxide (potassium hydroxide may also be used) in methanol, or sodium hydroxide (potassium hydroxide may also be used) in water to remove acetyl groups. The amount of basic reagent for use with respect to compound 3 is preferably 1% to 80% (molar equivalent with respect to raw material 3), or more preferably 5% to 10% (molar equivalent with respect to material 3). The reaction temperature is preferably 0° C. to 60° C., and more preferably room temperature. The reaction time is preferably one minute to five days, and more preferably approximately 30 minutes to approximately five hours.

Next, the deprotected sugar alcohol is dissolved in acetone, and then an isopropylidene group is introduced to positions 3 and 4 of galactose in the presence of an acid catalyst (camphor sulfonic acid, para-toluene sulfonic acid, etc.) to give compound 4. The proportion of the acid catalyst with respect to the raw material is preferably 1% to 80% (molar equivalent), and more preferably 10% to 30% (molar equivalent). Acetone is the source of the isopropylidene group as well as the solvent. Therefore, the amount of acetone to be used is usually in great excess, that is, several hundred times to tens of thousands of times in excess. To perform the reaction efficiently, dimethoxypropane is preferably added at 0.1 to 100 molar equivalents, and more preferably at 0.5 to 5 molar equivalents. The reaction time is preferably 30 minutes to seven days, more preferably one to 48 hours, and most preferably two to twelve hours. The reaction temperature is preferably room temperature to 50° C., and more preferably about room temperature.

Next, compound 4 is dissolved in DMF, sodium hydride (preferably 1.0 molar equivalent to 2.0 molar equivalents per hydroxyl group) and benzyl bromide or benzyl chloride (1.0 molar equivalent to 2.0 molar equivalents per hydroxyl group) are added, and then the mixture is allowed to react for five minutes to one week, causing the conversion to compound 5 (dibenzyl species). Normally, the reaction time is approximately one hour to 24 hours. The reaction temperature is preferably −10° C. to 80° C., and more preferably near room temperature.

FIG. 1 shows the total amount of benzyl bromide and sodium hydride (molar equivalent). On converting this to an amount per hydroxyl group, either one is 1.25 molar equivalent.

Compound 5 is converted to compound 6 in methanol or in a mixture of methylene chloride and methanol (methanol:methylene chloride is preferably 1:0 to 1:5, and more preferably 1:1) by selectively removing the 3,4-isopropylidene group in the presence of an acid catalyst (camphor sulfonic acid, para-toluene sulfonic acid, etc.). The acid catalyst to be used is preferably 1 to 200 molar equivalents, and more preferably 10 to 30 molar equivalents with respect to compound 5. The reaction time is preferably 30 minutes to seven days, more preferably one to 48 hours, and most preferably two to twelve hours. The reaction temperature is preferably room temperature to 50° C., and more preferably room temperature.

Next, compound 6 is dissolved in solvents such as toluene, heated under reflux with, for example, dibutyltin oxide (preferably 1.0 to 2.0 molar equivalents, and more preferably 1.0 to 1.5 molar equivalent with respect to compound 6), and continuously dehydrated. The refluxing temperature must be the boiling point of the solvent or higher. The reaction time is preferably one hour to five days, and more preferably three to 24 hours. Benzene, methanol, tetrahydrofuran (THF), and such may also be used instead of toluene. Next, the unisolated tin intermediate thus obtained is dissolved in toluene, THF, and such, then 1 to 5 equivalents of benzyl bromide or benzyl chloride are added in the presence of tetrabutylammonium bromide (preferably 0.1 to 3 molar equivalents, and more preferably 0.5 to 1.0 molar equivalent with respect to compound 6), and the mixture is reacted preferably at room temperature to 80° C., more preferably at room temperature to 50° C., and preferably for 30 minutes to 24 hours, and more preferably two to five hours to accomplish the conversion to compound 7 (tribenzyl species), which is selectively benzylated only at position 3 of galactose.

This compound 7 and the commercially available tetrabenzyl galactopyranosyl chloride are reacted in the presence of silver perchlorate (AgClO$_4$), silver triflate (AgOTf), or silver carbonate (Ag$_2$CO$_3$), to give the desired α-1-4-bonded compound 8 (disaccharide derivative). The amount of silver salt to be used is preferably 1.0 to 5 molar equivalents, and more preferably 1.0 to 1.5 molar equivalent with respect to compound 7. These silver salts may be used in combination. The reaction temperature is preferably −20° C. to 50° C., and more preferably 0° C. to room temperature. The reaction time is preferably one hour to one week, and preferably two to 24 hours. Furthermore, diethyl ether, chloroform, methylene chloride, and such may be used as the reaction solvent. Molecular sieves may be added as a drying agent.

Compound 8 is debenzylated and converted to compound 9 by being subjected to catalytic hydrogenation in a solvent in the presence of palladium black, palladium carbon, or palladium hydroxide under hydrogen atmosphere. Examples of solvents include methanol, ethanol, water, and ethyl acetate, and a mixture of methanol and ethyl acetate (1:1) may be used preferably. Catalytic amounts (approximately 1% to 30% molar equivalent) of hydrochloric acid, acetic acid, and such may be added to promote the reaction.

The reaction is performed preferably under 1 atmosphere to 100 atmospheres, more preferably under 1 to 80 atmospheres. FIG. 1 illustrates 50 atmospheres, but can be carried out at 1 atmosphere. At 1 atmosphere, the reaction time is one hour to one week, and preferably eight hours to 48 hours.

By following the above-mentioned scheme, the target biointeracting compound (sugar chain-comprising monomer) 9 can be synthesized.

Disaccharides were used as the ligands, but, when using ligands comprising trisaccharide structures instead of disaccharide ligands, the biointeracting compounds can be synthesized by an approach similar to that mentioned above. For example, instead of compound 1, the commercially-available "acetobromo lactose" can be used as the starting material, and the same reaction conditions as those for the conversions to compounds 2 to 7 can be used for facile conversion to the bromodecyl-2,2',3,3',6,6'-hexabenzyl lactose derivative in which positions other than the 4' position are protected with benzyl groups. This compound can be reacted with commercially available tetrabenzylgalactopyranosyl chloride by using silver salts as indicated above, yielding an α(1-4)-bonded trisaccharide. Subsequently, the trisaccharide ligand can be synthesized in a similar manner to the conversion from 8 to 9.

Furthermore, by using other ligands such as proteins (antigens or antibodies), hormones, or biotin, instead of the sugar chain, biointeracting compounds to which a variety of ligands are incorporated can be obtained.

When using proteins, spacer and binding groups can be reacted with appropriate amino acid residues of the protein.

For example, when serine residues are used as the amino acid residues, C10 spacers can be introduced to the serine residues by reacting 1,10-dibromodecane in DMF with sodium hydride according to a reaction similar to the conversion of compound 4 to 5 in FIG. 1. The reaction conditions in this case are the same as those for the conversion of compound 4 to 5 in FIG. 1. Next, the bromo group at the end of the spacer introduced to the serine hydroxyl group of the protein is converted to an azido group. An azido group can be introduced to the end as in the method for converting compound 2 to 3 in FIG. 1. As shown in FIG. 1, the azido group can be reduced to an amino group for introduction to the main chain polymer.

When other amino acid residues such as aspartic acids or glutamic acids are present, their carboxylic acids can be condensed through an amide bond with an appropriate length of a spacer (for example, 1-amino-10-bromodecane) comprising an amino group at its end in DMF or DMSO, using a condensation agent such as dicyclohexyl carbodiimide (DCC) or 1-ethyl-3-(3-dimethylaminopropyl) carbodiimide hydrochloride (EDC, or also called WSC). Acylurea rearrangement inhibitor such as HOBt may be added. Furthermore, bases such as triethylamine, diisopropylethylamine, pyridine, and 4-dimethylaminopyridine may be added. The reaction time is one hour to one week, and preferably three hours to 48 hours. The reaction temperature is 10° C. to 100° C., and is normally near room temperature. The terminal bromo group can be converted to an azido group, and subsequently reduced to the amino group, as in FIG. 1.

When a lysine residue exists in the protein, the reactive site is on the amino group. Therefore, a spacer (for example, 10-bromodecanoic acid) comprising a carboxylic acid at its end can be bound by an amide bond. This reaction is identical to the method for introducing a terminal amino group to aspartic acid or glutamic acid, and the reaction conditions and subsequent steps are also the same.

Additionally, milder methods (methods for minimizing the loss of protein function) such as those involving cyanuric acid and lysine residue, quinone and lysine residue (Michael addition), nitrophenylazide and lysine residue (photochemical reaction), and maleimide and cysteine residue (Michael addition) may be used.

Furthermore, by using other halogenated alkyl alcohols instead of 1-bromo-10-decanol, biointeracting compounds to which spacers comprising various numbers of carbons and different structures are introduced, can be obtained.

(Methods for Incorporating a Biointeracting Compound to a Polymer)

Next, the method for incorporating the aforementioned biointeracting compound 9 (sugar chain-comprising monomer) into an appropriate polymer will be explained according to FIG. 2.

For obtaining an ionic polymer comprising component units represented by the aforementioned formulae (3) and/or (4), as well as (5), for example, by using the reactive polymer 10 (commercially available product, weight average molecular weight: preferably 1,000 to 1,000,000, more preferably 100,000 to 400,000), reaction occurs very easily with the amino group of sugar chain-comprising monomer 9 to form an amide bond. This reaction is performed by mixing polymer 10 and monomer 9 under a nitrogen current in anhydrous N,N-dimethylformamide (DMF) or dimethylsulfoxide (DMSO).

Although the proportion of the biointeracting compound (sugar chain-comprising monomer) to be used is not limited and differs depending on the combination of the target biological substance and the sugar chain-comprising monomer, for example, 1 to 500 mole percent with respect to the reactive polymer can be added. Any amount of the compound can be added in order to appropriately adjust the relative content of the biointeracting group. As the proportion of the biointeracting compound to be used is increased, the number of biointeracting groups in the ionic polymer is increased. When using the aforementioned polymer 10, the number of biointeracting groups is theoretically up to 50% (molar equivalent) of the sum of the number of reactive functional groups. The preferred amount of biointeracting compound 9 (sugar chain-comprising monomer) to be used for obtaining the maximum 50% molar equivalent of the biointeracting group is preferably 50% to 300% molar equivalent, and more preferably 150% to 250% molar equivalent with respect to the ionic functional group in the raw polymer.

Since the polymers comprise anhydrides, in the Examples, the raw polymers (10) and the biointeracting groups (9) are reacted at an equimolar ratio (10:9=1:1), and at a 1:2 ratio.

The reaction temperature is preferably 0° C. to 130° C., and more preferably 20° C. to 90° C. The reaction time is preferably one minute to seven days, and more preferably five minutes to 48 hours. A base such as triethylamine, diisopropylethylamine, hexamethylphosphoric (tri)amide, or 4-dimethylaminopyridine may coexist in the reaction solution if necessary.

After work-up, water, sodium hydrogen carbonate solution, or a dilute aqueous alkaline solution such as sodium hydroxide or potassium hydroxide solution (0.1% to 50% by weight with respect to the total weight of the aqueous solution) is added to the reaction solution, and then dialyzed against water, to purify the target ionic glyco polymer 11. Instead of dialysis, purification can be performed using size exclusion chromatography (gel filtration) that uses a polyvinylalcohol-based polymer (column packing), methacrylic acid-based polymer (column packing), sephadex-based column packing, biogel, or such.

Identification of compounds and determination of the sugar chain content can be carried out by $^1$H-NMR, $^{13}$H-NMR, IR, and such. Furthermore, the molecular weight of the compounds after binding can be regarded as same as that of the raw polymers since the compounds are formed by simply binding the biointeracting groups to the raw polymers. However, if necessary, the average molecular weight of the compounds can be determined by carrying out separation using the above-described size exclusion chromatography (gel filtration) column, and then making a comparison with a standard polymer such as a polystyrene polymer. In addition, using a dynamic light scattering analyzer, the molecular size and molecular weight can be determined by comparison to a standard polymer such as polystyrene polymer. Molecular weight determination can also be carried out by ultra centrifugation.

Instead of this reactive polymer 10, ionic polymers can be obtained by a similar method using poly(isobutylene-alt-maleic anhydride), poly(butadiene-alt-maleic anhydride), poly(maleic anhydride-alt-1-tetradecene), and such.

When a polymer obtained by polymerization of acrylic acid monomers is used, in which a carboxylate is present on the side chain as an ionic functional group (that is, when obtaining an ionic polymer comprising the component units represented by the aforementioned formulae (1) and (2)), for example, by introducing biointeracting compound 9 (sugar chain-comprising monomer) to the polymer comprising carboxylates, instead of the aforementioned polymer 10, the ionic glyco polymer represented by the aforementioned formula (10) can be synthesized. In the aforementioned formula (10), a disaccharide is used for the sugar chain, and a sodium ion is used for the carboxylate salt, but these are not limiting, and the biointeracting groups of various ligands can be incorporated.

First, in the method for introducing the biointeracting group in this case, a commercially available polyacrylic acid, or a polymer such as polyethylene maleic acid, which carries carboxylates as ionic functional groups for its side chains, is reacted with the biointeracting compound (sugar chain-comprising monomer 9) in DMF (dimethylformamide) or DMSO (dimethylsulfoxide), using an appropriate condensing agent such as dicyclohexyl carbodiimide (DCC) or 1-ethyl-3-(3-dimethylaminopropyl) carbodiimide hydrochloride (EDC; or also called WSC). A regent such as HOBt (1-hydroxy-1H-benzotriazole) that prevents acylurea rearrangement may be added. Bases such as triethylamine and diisopropylethylamine, pyridine, and 4-dimethylaminopyridine may also be added.

The reaction temperature is preferably room temperature to 100° C., and more preferably room temperature to 50° C. The reaction time is preferably one hour to eight days, and more preferably five to 20 hours.

In this case, although the proportion of the biointeracting compounds (sugar chain-comprising monomer) to be used is not limited and differs depending on the combination of the target biological substance and the sugar chain-comprising monomer, for example, 1 to 500 mole percent with respect to the reactive polymer can be added. To appropriately adjust the content of the biointeracting groups, any amount of the compounds can be added.

When using a polymer in which the carboxylic acid portion is replaced with benzene sulfonic acid, for example, sugar chain 9 can be introduced to the polystyrene sulfonic acid polymer by applying the same method as described above.

More specifically, instead of using the aforementioned reactive polymer 10 or analogues thereof, a styrene sulfonic acid chloride polymer, which comprises sulfonic acid chloride as the ionic functional group on the polymer side chain, is reacted as the raw polymer, and the unreacted sulfonic acid chloride is quenched with water or dilute alkaline aqueous solution, such as sodium hydrogen carbonate, sodium hydroxide, or potassium hydroxide solution (0.1% to 50% mole ratio) to synthesize an ionic polymer with sulfonamide linkage, represented by the aforementioned formula (11), in a similar manner.

Furthermore, by using a polysulfonic acid polymer comprising sulfonic acids on the side chains instead of using a polysulfonic acid chloride polymer, for example, a biointeracting group such as 9 in FIG. 1 can be introduced under conditions for condensing the aforementioned polyacrylic acid and the biointeracting compound to obtain the ionic polymer represented by formula (11). The reaction conditions and temperature are the same as those described above. For this method, determination of molecular weight and sugar content is performed as in the aforementioned method for determining sugar content.

In this case as well, although the proportion of the biointeracting compound (sugar chain-comprising monomer) to be used is not limited, and differs depending on the combination of the target biological substance and the biointeracting group, for example, 1 to 500 mole percent, and preferably 1 to 99 mole percent with respect to the reactive polymer can be added.

The relative content of the biointeracting group (the sugar chain portion) can be adjusted appropriately to approximately 1% to 99% (in which at least two or more ionic groups A must be present, and this can be achieved by a method for appropriately adjusting the molar equivalent of the biointeracting group).

Furthermore, when using polyamino acids such as polyaspartic acid or polyglutamic acid, besides using polymers comprising carboxylic acids or sulfonic acids, a method for introducing biointeracting groups to the polyamino acids can be carried out using a method similar to the method for synthesizing a biointeracting compound to which a protein (antigen or antibody) instead of a sugar chain as the ligand is incorporated. Desirably, for preferable use the average molecular weight of such polyamino acids is, for example, 2,000 to 1,000,000, and more preferably 100,000 to 500,000.

Alternatively, a polymer comprising aldehyde groups instead of carboxyl groups on the polymer side chains (for example, polyethylene glycol-ω-aldehydes of molecular weight ranging from 100,000 to 1,000,000, or their dimethyl acetal derivatives) can be used. In such cases, the amino group of the aglycone portion of the sugar chain-comprising monomer and the aldehyde of the polymer are bound through Schiff base formation in an organic solvent or in water (including buffer). Subsequently, a more stable compound can be obtained by reducing using $NaBH_3CN$, dimethylborane, and such.

On the other hand, when an amino group is present on the polymer side chain, for example, the terminal amino group of the biointeracting compound (the terminal amino group of the aglycone portion in the case of sugar chain-comprising monomer 9) can be converted to its corresponding carboxylic acid, and then bound to the polymer-comprising amino groups. This reaction can be performed under conditions similar to those for binding the aforementioned polymer, which comprises carboxylic acids or sulfonic acids on side chains, to the sugar chain-comprising monomer 9, which comprises an amino group in the aglycone portion.

Specifically, this reaction is carried out as follows:

For biointeracting groups comprising terminal carboxylic acids, compound 2 in FIG. 1 is subjected to the same conditions as in the conversion of 3 to 4 in FIG. 1, while leaving the terminal bromo group as it is to obtain the derivative in which the azido portion of 4 is a bromo group. Next, the derivative comprising the bromo terminus is reacted in the same way as for the conversion of 4 to 5, to obtain a compound in which the azido group of 5 is a bromo group. After removing the isopropylidene group as for the conversion of 5 to 6, selective benzylation is performed as in the conversion of 6 to 7, and a disaccharide derivative in which the terminal azido group of 8 is a bromo group can be obtained, as in the conversion of 7 to 8.

Next, this derivative (disaccharide) comprising the bromo group in the aglycon terminal is reacted in DMF in the presence of sodium acetate or cesium acetate (1 molar equivalent to 30 molar equivalents, or preferably 1 molar equivalent to 10 molar equivalents, relative to the bromo derivatives) at room temperature to 120° C., or preferably at room temperature to 80° C. This reaction leads to conversion of the derivative to the compound in which the azido group of 5 in FIG. 1 is an acetyl group (OAc). Alternatively, the derivative can be heated (to 50° C. to 100° C., or preferably 50° C. to 80° C.) in aqueous sodium (potassium, calcium, or such) hydroxide solution. In this case, the azido group of compound 5 is a hydroxyl group. Those with a terminal acetyl group are converted to those with a terminal hydroxyl group by removing the acetyl group, as for the conversion of 3 to 4.

Swern oxidation is then performed on the sugar chain of the compound thus obtained, in which the terminal azido group of 5 in FIG. 1 is replaced with a hydroxyl group. Specifically, in methylene chloride, oxalyl chloride (1 molar equivalent to 50 equivalents, or preferably 2 equivalents to 10 equivalents) and DMSO (1 equivalent to 1,000 equivalents, preferably 2 equivalents to 50 equivalents) are added to the compound at −78° C., and reacted for one minute to 24 hours, normally 30 minutes to three hours. The temperature of the solution is then raised to −20° C. to +30° C. (normally −10° C. to +10° C., most preferably approximately 0° C.), and diisopropylethylamine or triethylamine (1 equivalent to 1,000 equivalents, preferably 2 equivalents to 50 equivalents) is added thereto and reacted for one minute to three days, normally, ten minutes to ten hours. This operation converts the terminus of the compound to an aldehyde group. This compound comprising terminal aldehyde group can be linked through a Schiff base to the corresponding polymer comprising amino groups on its side chains.

This aldehyde group is reacted in a mixture of t-butyl alcohol and aqueous sodium hydrogen phosphate solution ($NaH_2PO_4 \cdot 2H_2O$) with an oxidizing agent such as $NaClO_2$ (1 equivalent to 100 equivalents, or preferably 2 equivalents to 50 equivalents, with respect to the aldehyde) for ten minutes to one week, or one hour to 48 hours, for oxidation to the carboxylic acid, yielding a disaccharide derivative whose terminus is converted to a carboxylic acid.

These disaccharides whose terminus is an aldehyde group or a carboxylic acid can then be deprotected under conditions similar to that for the conversion from 8 to 9 in FIG. 1 (herein, catalytic hydrogenation is preferably performed at 1 atmosphere or less) to yield sugar chains in which the terminus of compound 9 is an aldehyde or a carboxylic acid.

The compound comprising a sugar chain with a terminal aldehyde or carboxylic acid, which is obtained as described above, can be reacted with an ionic polymer comprising an amino group in its side chain according to the aforementioned method for Schiff base formation or amide formation. As a result, a polymer comprising sugar chains as the biointeracting group on its side chains, which are bound to the main chain ionic polymer by a Schiff base or its reduced form, or by an amide bond (in this case, the unreacted main chain amino group corresponds to the ionic group (A)), can be obtained.

When a sugar chain monomer comprising a carboxylic acid at its terminus is the biointeracting group, the raw polymer to be reacted is not limited to polymers comprising amino groups on their side chains. As mentioned above, the raw polymers may comprise sulfonic acid or such on their side chains.

Furthermore, an alternative method may comprise the steps of reacting the protected glyco monomer with a raw polymer, and then removing the protecting groups on the sugar chain portion. More specifically, for example, a sugar chain monomer, which is the biointeracting group synthesized by the above-mentioned method, comprising an aldehyde group or a carboxylic acid group on its terminus is linked in advance to a polymer comprising amino groups on its side chains according to the above-described methods for Schiff base formation or for amide formation, and then the protecting groups (benzyl groups in this case) linked to the sugar chain portion are completely removed by the method as described above (according to the method for removing benzyl groups) to obtain the target sugar chain-comprising ionic polymer.

Ionically Bound Polymer-comprising Substrate

In the ionically bound polymer-comprising substrate of this invention, the aforementioned ionic polymer is bound to a substrate through two or more ionic bonds to form the outermost layer.

Furthermore, the ionic polymer may form ionic bonds with the substrate through at least one polyionic polymer membrane.

The polyionic polymer membranes may comprise polycationic polymer membranes and polyanionic polymer membranes. Such polyionic polymer membranes as mentioned above may be a layer-by-layer film produced by alternating polycationic polymer membranes and polyanionic polymer membranes.

Examples of polymers that form polycationic polymer membranes include poly(diallyldimethylammonium chloride), polylysine, polyguanidine, or alkyl ammonium salts or ammonium salts thereof.

Examples of polymers that form polyanionic polymer membranes include poly(ethylene maleic acid) and poly (styrene sulfonate).

Examples of substrate materials include gold, glass, plastic well, polyvinyl chloride, and paper. Gold is preferably used when using the ionically bound polymer-comprising substrate of this invention as a detection sensor for biological substances. Without limitation, the substrate form includes plate, tubular, and spherical forms. Of these, substrates in a plate form are preferably used in this invention.

In the present invention, the ionic polymer is ionically bound to the substrate by two or more ionic functional groups (A). Specifically, charged groups of two or more ionic functional groups (A) are present in the ionic polymer, which do not react with the biointeracting group. Therefore, a gold substrate or such that is pre-modified with low-molecular weight alkanethiol compounds comprising a charge opposite to the ionic functional group (A), can be ionically bound with the ionic polymer, and the ionic polymer can firmly be immobilized onto the substrate by a multivalent effect (strong binding of polymers to each other by the multi-points of ionic bonds). Compared to cases with a monomer comprising a single charge, this immobilization is presumed to be accomplished by the formation of stronger ionic bonds due to simultaneous immobilization of multiple charges existing on the ionic polymer to the substrate.

Therefore, the polymer does not come off easily, even if the substrate is immersed in water or buffer for a long time, unlike the case of monomers immobilized simply by hydrophobic interactions. An ionically bound polymer-comprising substrate that is extremely stable in water and even in buffers of high ionic strength can be formed. Furthermore, an ionically bound polymer-comprising substrate can also be stably formed under acidic and alkaline conditions.

Furthermore, by repeatedly accumulating (immobilizing) alternate polycationic polymer and polyanionic polymer membranes onto a substrate, and then ionically binding the ionic polymer in the last step, ligands that can bind to biological substances such as verotoxins can be placed at the outermost layer.

In such cases, the number of times that the ionic polymer membrane is accumulated depends on the charge of the low-molecular weight compound bound to the substrate surface and the type of charge of the ionic polymer. The polymer can be immobilized with greater strength and stability by repeating the accumulation process preferably from one or two times to 20 times, more preferably from five or six times to 20 times, and most preferably from approximately ten times to 15 times.

Methods for binding ionic polymers and for binding polyionic polymer membranes are specifically described below.

An ionic polymer is dissolved in water (or buffer), or by adding solvents such as DMF and DMSO to water or buffer (concentration: 1 μg/mL to 100 g/mL, and preferably 10 μg/mL to 10 mg/mL), and is immobilized (accumulated) by a batch method or flow system. The pH of the buffer may be acidic (for example, pH 4.5), neutral (near pH 7), or alkaline (near pH 8). The use of buffer is preferred over water.

For the batch method, the above-mentioned solution is dropped onto the aforementioned substrate or such, or the substrate or such is immersed in the solution. The method is carried out for one second to one week, preferably one second to ten hours, more preferably one minute to three hours, at 0° C. to 100° C., and preferably 10° C. to 50° C. For dropwise addition, the solution is left to dry naturally, is dried under a stream of nitrogen gas, or is dried under vacuum. For immersion, the substrate is rinsed gently with water, ethanol, or a mixture thereof, and then dried in a similar manner as described above. This procedure can be repeated several times. Next, an ionic polymer comprising an opposite charge is accumulated in a similar manner. This procedure can be also repeated several times.

For the flow cell system, the solution into which polymer is dissolved flows continuously at a flow rate of 1 μL/min to 1 mL/min for one minute to one week, or preferably one minute to 48 hours. Subsequently, this flow cell is washed with buffer, water, or such, and this procedure is repeated as necessary. Next, the oppositely charged polymer is accumulated in a similar manner.

Immobilization to a Gold Surface

Hereinafter, immobilization of an ionic polymer, which comprises sugar chains as ligands, to a gold substrate surface will be described more specifically, using FIG. 2.

First, a thoroughly washed gold substrate is immersed in 3-mercaptopropionic acid-ethanol solution for ten minutes to three days, according to a standard method for obtaining a hydrophobic substrate. This procedure is carried out at around room temperature (20° C. to 30° C.) for a duration of preferably one hour to 30 hours. Methanol or alkaline aqueous solution may be used instead of using ethanol. Furthermore, instead of using 3-mercaptopropionic acid, ω-mercapto fatty acids comprising a longer aliphatic group (for example, 10-mercaptodecanoic acid), or 4-thiobenzoic acid and such comprising an aromatic group may be used. In addition, lipoic acid may be used. FIG. 2 shows an example using 3-mercaptopropionic acid.

Next, a gold surface onto which 3-mercaptopropionic acid is immobilized as a self-assembly monolayer (SAM) is obtained (surface A). This surface is reacted with a polycationic polymer (for example, quaternary alkyl ammonium salts or primary ammonium salts) such as poly(diallyl dimethyl ammonium chloride), polylysine, or polyguanidine in acidic, neutral, or basic buffer, or in pure water, to obtain a substrate whose surface is covered with polycations (surface B).

Furthermore, by a similar method, polyanionic polymers such as poly(ethylene maleic acid) and poly(styrene sulfonate) are immobilized on the substrate surface (surface C). These procedures are repeated several times to over ten times, then a polyionic polymer membrane (polycationic polymer membrane in FIG. 2) comprising charges opposite to that of the ionic polymer comprising biointeracting groups is used to cover up (accumulate on) the substrate surface.

Alternatively, an ionic polymer 11 comprising biointeracting groups can be immobilized directly to surface B without repeating the accumulation process. This is illustrated in the Examples below.

Finally, by treating the surface with ionic polymer 11 comprising biointeracting groups to construct surface D, whose outer layer is covered with ligands of the ionic polymer (sugar chains in FIG. 2), an ionically bound polymer-comprising substrate capable of detecting biological substances such as verotoxins can be obtained.

Ionic polymer 11 was used for the final step, but alternatively, ionic polymer 11 can be used instead of the polyionic polymer comprising the same charge as that of the ionic polymer (in FIG. 2, the polyanionic polymer), used in the preceding steps of this procedure.

In FIG. 2, surface A comprises carboxylates on the substrate surface, but may be covered with other anions such as sulfonates.

Furthermore, a gold surface (for example, surface E in FIG. 3) obtained with SAM of cationic compounds comprising $NH_3^+$ and such can also similarly immobilize ionic polymer 11 on its outermost layer. Specifically, immobilization of polyanionic polymer membranes and polycationic polymer membranes on surface E is repeated, and after covering with a polycationic polymer membrane, the anionic ionic polymer 11 is immobilized, thereby providing surface F on which ligands such as sugar chains are immobilized on the substrate.

The above-mentioned procedures are performed by soaking in solution, but immobilization can also be achieved by a method comprising the step of adding dropwise polyanionic polymer membrane, polycationic polymer membrane, and the like, to a chip surface, gently rinsing, and then drying. Alternatively, the ionic polymer can be made to flow at a constant flow rate using a flow cell method. Specific illustrations are shown in the Examples below.

Furthermore, when primary ammonium salts instead of quaternary alkylammonium salts are present on the substrate surface, as in surface E, immobilization is often insufficient. Therefore, in such cases, ionic polymer 11 can be directly immobilized without repeated accumulation. Preferably, the polyanionic polymer membrane and polycationic polymer membrane are immobilized once or twice and then the ionic polymer 11 is finally immobilized.

Covalently Bound Polymer-comprising Substrate The covalently bound polymer-comprising substrate of this invention is formed by covalently binding two or more ionic functional groups (A) in the aforementioned ionic polymer with two or more functional groups on the substrate.

The form of the bond is not limited, as long as the ionic functional group in the ionic polymer and the functional group bound to the substrate surface can form covalent bonds, and examples of the forms of such bonds include amide bonds, urea bonds, ester bonds, Schiff bases, and reduced forms thereof, as well as C—C bonds.

Figure 2:
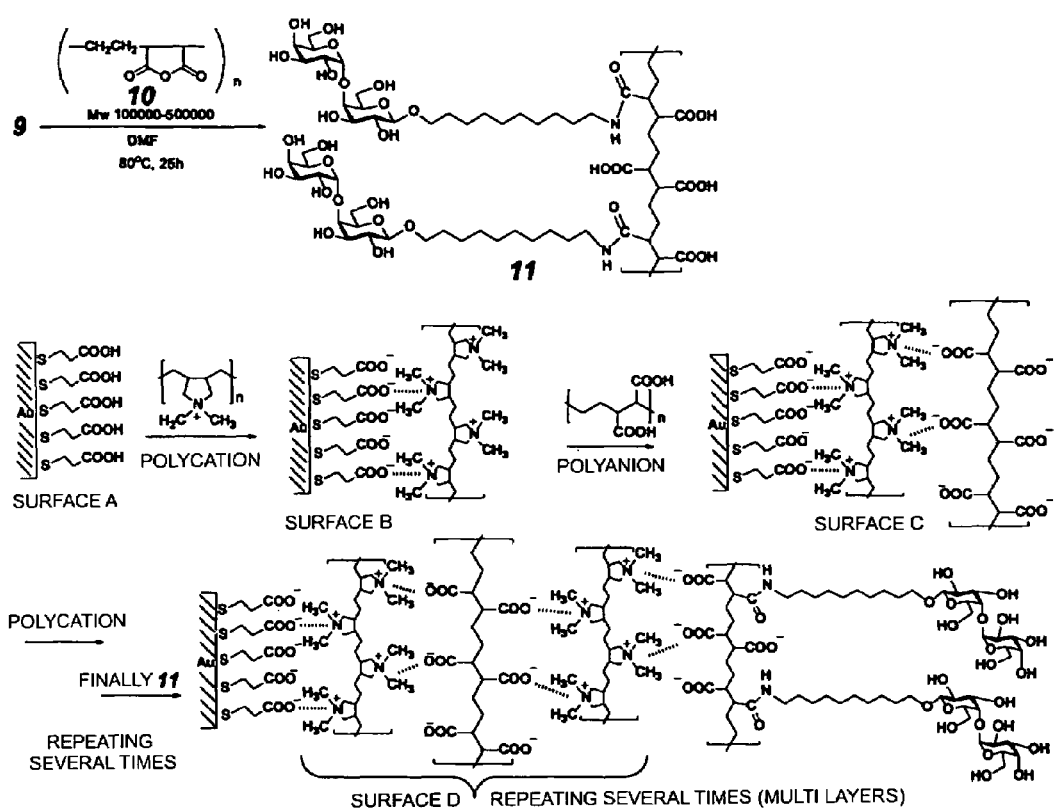
FIG. 2 is a scheme showing an example of a method for producing the ionic polymers and the ionically bound polymer-comprising substrates.
Figure 3:
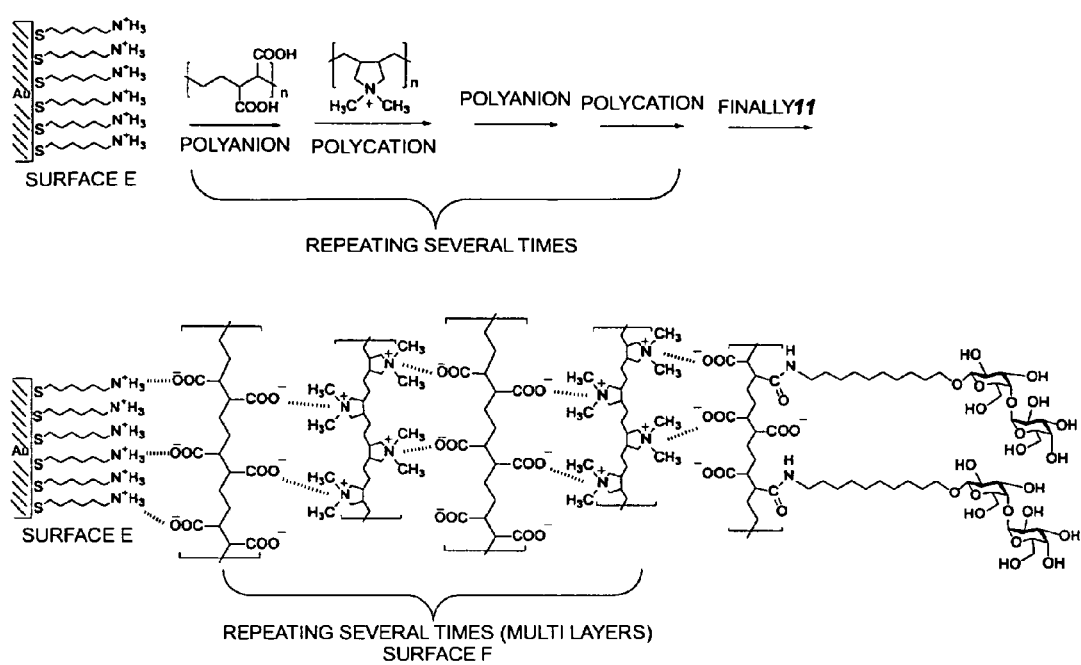
FIG. 3 is a scheme showing an example of a method for producing the ionically bound polymer-comprising substrates.

Another example is a method for binding the aforementioned ionic polymer 11 that comprises two or more carboxyl groups, shown in FIG. 2, to a substrate carrying amino groups on its surface, by covalent bonds. The methods for binding may be carried out using a batch system or flow system.

In batch systems, a hydrophobic treatment is applied to the gold by washing its surface with a mixture of aqueous hydrogen peroxide solution (30%): evaporated sulfuric acid (1:3, v/v), treating it with an ozone cleaner for sufficient washing, and then reacting the gold substrate with ω-amino-1-alkanethiol [$HS-(CH_2)_n-NH_2$ (wherein n is an integer of 2 to 20); e.g., aforementioned 6-amino-1-hexanethiol], cystamine ($H_2NCH_2CH_2SSCH_2CH_2NH_2$), and such in advance. Ionic polymer 11 is dissolved in DMF (or DMSO, etc.), then the pre-modified gold substrate is soaked in this solution, or the solution is dropped on to the gold area.

Hereinafter, the method for immobilizing ionic polymer (sugar chain polymer) 11 onto a gold substrate, which has been subjected in advance to hydrophobic treatment with terminal amino alkanethiol, will be described, but it is not to be construed as being limited to this example.

Next, using a dehydrating condensation agent such as hydroxybenzotriazole (HOBt) (HOBt may be used if necessary), 1-ethyl-3-(3-dimethylaminopropyl)carbodiimide hydrochloride, or N,N'-dicyclohexylcarbodiimide (DCC), with (or without) a base such as triethylamine, ionic polymer 11 is thoroughly dehydrated, and then dissolved in DMF or DMSO together with a condensation agent and such. The resulting reaction solution is dropped (applied) on to the above-described substrate surface, or the substrate (the gold area) is soaked in this reaction solution. The reaction can be performed at room temperature to 50° C., for one hour to one week. After the reaction, washing is performed with DMF, ethanol, and such, to obtain a covalently bound polymer-comprising substrate. The above-mentioned method is desirably performed under anhydrous conditions.

On the other hand, a method for immobilizing the ionic polymer in an aqueous solution (buffer) using the flow system can be carried out. The method is used, for example, for activating the gold surface using N-ethyl-N'-(3-dimethylaminopropyl) carbodiimide hydrochloride (EDC) or N-hydroxysuccinimide (NHS), and then immobilizing the ionic polymer.

In such cases, all reactions are carried out in water or a buffer such as phosphate buffer. Up to 50% of dimethylsulfoxide may be added. The reaction temperature is preferably 10° C. to 80° C., more preferably room temperature to 40° C. The reaction time is preferably one minute to seven days, more preferably three minutes to ten hours.

Recently, immobilization kits are commercially available and may be used. For example, the commercially available BIACORE CM5 (Biacore) comprises carboxylic acids on the substrate surface, therefore, these carboxylic acids can be activated as in the method mentioned above, and then for example, after introducing a compound comprising an amino group such as hydrazine (due to this procedure, a free amino group appears at the end), the ionic polymer comprising carboxylic acids can be immobilized by a method using either the flow system or the batch system.

Since the covalently bound polymer-comprising substrate obtained by the above-mentioned method comprises biointeracting groups fixed on the substrate by chemical bonds, and is thus extremely stable and easily handled, it can be used effectively for qualitative and quantitative analyses of pathogenic bacteria and toxins.

Hydrogen-bound Polymer-comprising Substrate

Methods for using ionic bonds to bind or immobilize an ionic polymer to a substrate surface that carries ions with an opposite charge to the polymer (i.e., an opposite charge that forms a pair), and methods for using covalent bonds to immobilize an ionic polymer to a substrate, are described above. Alternatively, methods for binding or immobilizing ionic polymers using hydrogen bonds, for example with a polymer (polyarginine) comprising guanidine groups on its side chains, can be used. This immobilization can be performed in a similar manner to methods for immobilizing both ionic polymers using ionic bonds.

Ionically bound polymer-comprising substrates, covalently bound polymer-comprising substrates, and polymer-comprising substrates by hydrogen bonds are generically called polymer-comprising substrates.

Ionic Polymers for Detecting Biological Substances, Substrates for Detecting Biological Substances, Sensors, and Reagents for Detecting Biological Substances In the above-mentioned ionic polymers, ionically bound polymer-comprising substrates, covalently bound polymer-comprising substrates, or hydrogen bound polymer-comprising substrates of this invention, a number of ligands are bound to the polymer, and this polymer can bind to biological substances more efficiently and strongly than the monomer alone, due to the "multivalency effect" or "cluster effect". Therefore, such polymers are preferably used as sensors for detecting biological substances.

Furthermore, the sensors of the present invention comprise the aforementioned ionic polymers or the aforementioned polymer-comprising substrates. More specifically, ionic polymers alone can be used as adsorbing agents for adsorbing specific biological proteins (the types of this protein will be determined depending on the sugar chain structure of the ligand as described above), or as neutralizing agents for toxins. Since polymer-comprising substrates can specifically bind to specific biological proteins or toxins, the substrates can be used with the quartz crystal microbalance (QCM) method, the surface plasmon resonance (SPR) method, or such to rapidly measure these specific proteins and toxins. The amount of bonding biological substance can be determined from changes in frequency for QCM, or from changes in resonance angle for SPR.

Furthermore, by immobilizing or adsorbing onto a support such as cellulose or a membrane, the above-described ionic polymers of this invention can be used as reagents for detecting biological substances. More specifically, by introducing fluorescent reagents such as fluorescein or fluorescein cadaverine as ligands and further by introducing sugar chains or such as the biointeracting groups to the ligands, a polymer can be constructed as described above, such that the three components (fluorescent agents, sugar chains, and ionic group A) simultaneously exist on its main chain. Since the fluorescent reagent indicated herein comprises an amino group within the molecule as the binding group, the ionic group A of the main chain polymer can be bound with this amino group by an amide (covalent) bond, as described above.

When a biological substance binds to this fluorescent polymer, the fluorescence intensity of the polymer changes (increases or decreases; the change differs depending on the interaction target, and the intensity relationship cannot be discussed uniquely). Qualitative and quantitative analyses can therefore be performed using this intensity change.

Methods for Detecting Biological Substances

According to the present invention, substrates in which ligands are firmly and stably immobilized can be produced (converted to a sensor), and thus biological substances such as verotoxins can be rapidly and stably detected under normal analysis conditions, such as in water or in buffer, by incorporating with quartz crystal microbalance measuring devices or surface plasmon resonance.

An example of a detection method is indicated below:

Verotoxin Detection Experiment Using the Surface Plasmon Resonance (SPR) Method and the Quartz Crystal Microbalance (QCM) Method Herein, using the actual verotoxin and the standard protein, lectin, the methods for detecting the toxin and the protein are indicated.

Biological substances such as toxins and proteins are preferably detected in a phosphate buffer, acetate buffer, HEPES buffer, or Tris buffer, more preferably in a HEPES buffer, while maintaining a constant temperature in the range of preferably 0° C. to 60° C., and more preferably 25° C. to 40° C. A sample comprising biological substances such as verotoxins and proteins is slowly injected to the buffer. For example, verotoxins are commercially available or may be obtained from other researchers.

However, commercially available verotoxin contains a mixture of both verotoxin-1 and verotoxin-2, and therefore, accurate affinity constants for the verotoxins cannot be determined using QCM or SPR. In such cases, verotoxins with purity of 99.9% or more (that is, verotoxin-1 that does not comprise verotoxin-2, and vice versa) are used preferably.

A specific detection method is described below:

In the batch system, as mentioned above in the method for binding ionic polymers and binding polyionic polymer membranes, ionic (sugar chain) polymers (such as 11 in FIG. 2) are immobilized on the outermost layer (top layer) of a gold substrate or such, and then immersed in a reaction chamber (cell) comprising 0.01 μL to 100 mL of buffer. After dissolving or diluting several pg of the toxin to several mg in 1 μL to 50 mL of buffer (such as HEPES buffer as shown above), several μL to several mL of resulting toxin solution is slowly added to the reaction chamber (cell) in which the substrate is immersed, using a syringe or such. The mixture in the reaction chamber can be stirred using a stirrer. Furthermore, the temperature should be regulated at 10° C. to 50° C., preferably 20° C. to 40° C. When the amount of buffer is small (several μL), the buffer may be dropped onto the substrate. Precautions must be taken to avoid drying.

In the case of a flow injection system, an ionic polymer (such as 11 in FIG. 2) is immobilized to a gold substrate by an above-described method for binding the ionic polymer and binding the polyionic polymer membrane, and this substrate is set at a designated position of the device. By the same method as indicated for the batch system, a sample is prepared by dissolving or diluting the toxin or such in a buffer. The toxin sample is allowed to flow at the flow rate mentioned above in the method for binding the ionic polymer and binding the polyionic polymer membrane, and is injected by an automatic injection device, and therefore the toxin flows to the ionic polymer-immobilized substrate. In this system the temperature is preferably controlled within the same temperature range as for the batch system.

In either case, additional fresh sample is added either after the signal reaches an equilibrium, or one minute to three hours after the addition. This procedure may be performed several times, as necessary. The amount of protein (toxin) bound to the substrate, the binding rate constant (ka), dissociation rate constant (kd), affinity constant, and such are determined, and in addition, the biological substance bound to the substrate is detected from the change in frequency (for QCM) or change in resonance angle (for SPR).

The amount of protein or toxin can be determined by preparing a calibration curve. The affinity constant is determined by using a reciprocal plot of the binding amount against concentration (for QCM).

The SPR method allows determination of the dissociation rate constant (kd). When using BIACORE 3000 or BIACORE 2000 (both manufactured by Biacore), the constant can be determined from the relationship between the actual and calculated binding curves and dissociation curves.

When using a verotoxin as the biological substance, pure (100%) verotoxin or a verotoxin sample solution comprising interferent proteins (nontoxic proteins such as membrane proteins or enzymes) as well as verotoxin may be used. Most desirably, the sample solution does not comprise any interferent proteins (0% interferent protein, 100% verotoxin). However, sample materials cannot be purified enough during preparation steps. Therefore, the most preferable samples have a minimized proportion of interferent proteins. Specifically, samples comprising 99% (by weight) or less of interferent proteins (and 1% or more of verotoxin), or if possible, 90% or less of the interferent proteins (and 10% or more of verotoxin) is preferred.

In the present invention, by performing the above-mentioned procedures, verotoxins and other proteins can be readily detected (determined to be present or absent) by the appropriate devices thus used therein. Moreover, the binding rate constant (Ka), the dissociation rate constant (Kd), or such can also be easily determined by the devices as mentioned above.

As mentioned above, in order to immobilize ligands on the sensor portion (conversion to a sensor), methods for directly binding a ligand derivative comprising a thiol (—SH) to the gold substrate ([ligand-spacer-SH]), and for ionically binding a ligand with gold through an ionic monomer compound ([ligand-spacer-ion (+/−)]) can be used. In addition, methods for immobilizing using monolayer films can be used.

The former method comprises laborious synthetic procedures for introducing a thiol to the sugar chain in advance. Furthermore, since the resulting thiol portion is unstable, it must be bound to the gold of the quartz crystal microbalance immediately after synthesis. Thus, in practice, this method is hardly used to detect biological substances such as verotoxins.

Furthermore, in the latter two methods, since the sugar chain, which is the detection reagent, is bound ionically or hydrophobically at the monomer level, the bonds lack stability. Thus, these methods are problematic in that detection reagents detach from substrates when immersed for a long time in buffer of high ionic strength.

As described above, according to the present invention, hydrophobic ionized alkane thiols and such are pre-adsorbed to a substrate, and two or more ionic bonds are formed between these functional groups and the positively- or negatively-charged ionic functional groups remaining on the ionic polymer. Thus, due to multivalent ion effect, which involves attraction between multiple charges, the interaction is incomparably stronger than that with the monomer, contrasting with conventional, simple immobilization at the monomer level by ionic attraction forces, or immobilization by simple hydrophobic interactions. Thus ligands that have an excellent ability to detect biological substances, such as verotoxin, can be easily and stably immobilized to a substrate.

Furthermore, in the present invention, since the ionic polymers have multiple ligands therein, which can specifically bind to biological substances such as verotoxin, the cluster effect of the ligands can achieve strong binding with biological substances such as verotoxins.

Accordingly, in the present invention ligands are firmly and stably immobilized, and a sensor to which a large number of ligands are immobilized can be constructed at one time. Furthermore, by incorporating the sensor into commercially available quartz crystal microbalance measuring devices or surface plasmon resonance devices, biological substances such as verotoxins can be detected rapidly and stably under normal analysis conditions, such as in water or in buffer.

Any patents, published patent applications, and publications cited herein are incorporated by reference.

The present invention will be specifically explained below with reference to Examples, but is not to be construed as being limited thereto.

EXAMPLE 1

Synthesis of Compound 9

Compound 9 in FIG. 1 was synthesized as described below:

[Synthesis of Compound 2]

123.0 mg (0.52 mmol) of 10-bromo-1-decanol (Tokyo Chemical Industry) and 137.9 mg (0.5 mmol) of $Ag_2CO_3$ were dissolved in 2 mL of methylene chloride ($CH_2Cl_2$). MS4A (molecular sieves) was added to the mixture, and then stirred at room temperature for one hour. 205.6 mg (0.5 mmol) of 2,3,4,6-tetra-O-acetyl-α-D-galactopyranosyl bromide (A7562, Sigma (compound 1)) in 3 mL of $CH_2Cl_2$ was added dropwise to the mixture over 40 minutes, and then the reaction was carried out at room temperature for 20 hours. Triethylamine was then added to the reaction solution, and this mixture was filtered through celite. The filtrate was evaporated and purified by column chromatography (ethyl acetate: hexane=4:6). 208.6 mg (0.36 mmol, 72%) of compound 2 was obtained as a result.

The NMR data of compound 2 is as follows.

$^1$H NMR (400 MHz, $CDCl_3$): δ 5.387 (dd, H-4, J=3.2 and 0.8 Hz), 5.204 (dd, H-2, J=8.0 and 10.4 Hz), 5.018 (dd, H-3, J=3.2 and 10.4 Hz), 4.452(d, H-1, J=8.0 Hz), 4.191 (dd, H-6, J=6.4 and 11.2 Hz), 4.126 (dd, H-6', 7.2 and 11.2 Hz), 3.91-3.85 (m, H-5 and —($CH_2$)—, 2H), 3.49-3.44(m, —($CH_2$)—, 1H), 3.407(t, —$CH_2$—Br, J 6.8 Hz, 2H), 2.149 (Ac), 2.051 (Ac), 2.049 (Ac), 1.986 (Ac), 1.88-1.81 (m, —($CH_2$)—, 2H), 1.62-1.24 (m, —($CH_2$)—, 14H).

[Synthesis of Compound 3]

1.4625 g (2.58 mmol) of compound 2 and 300 mg (4.61 mmol) of sodium azide ($NaN_3$) were reacted in 20 mL of dimethylformamide (DMF) at 80° C. for four hours. After ethyl acetate and saturated saline were added to the reaction solution, the organic layer was separated, dried over magnesium sulfate, evaporated, and then purified by column chromatography (ethyl acetate: hexane =4:6). 1.3533 g (2.55 mmol, 99%) of compound 3 was obtained as a result.

The NMR data of compound 3 is as follows.

$^1$H NMR (400 MHz, $CDCl_3$): δ 5.386 (d, H-4, 3.2 Hz), 5.204 (dd, H-2, 8.0 and 10.4 Hz), 5.018 (dd, H-3, 3.2 and 10.4 Hz), 4.453(d, H-1, J 8.0 Hz), 4.191 (dd, H-6, J 6.4 and 11.2 Hz), 4.126 (dd, H-6', J 7.2 and 11.2 Hz), 3.91-3.85 (m, H-5 and —($CH_2$)—, 2H), 3.49-3.44 (m, —($CH_2$)—, 1H), 3.256(t, —$CH_2$—$N_3$, J 6.8 Hz, 2H), 2.147, 2.051, 2.049 and 1.986 (4×Ac), 1.64-1.24 (m, —($CH_2$)—, 16H).

[Synthesis of Compound 4]

Sodium methoxide (NaOMe) was added to 707.8 mg (1.34 mmol) of compound 3 in 20 mL of methanol, and then reacted at room temperature for three hours. The reaction solution was neutralized using an ion exchange resin (Dowex $H^+$ form), and then filtered. The evaporated crude product was dissolved in 20 mL of acetone, to which 0.86 mL (7 mmol) of dimethoxypropane and 255 mg (1.1 mmol) of camphor sulfonic acid (CSA) were then added. This mixture was reacted at room temperature for 2.5 hours, and then triethylamine was added to stop the reaction. After concentration of the reaction solution and addition of ethyl acetate thereto, this solution was washed with saturated sodium hydrogen carbonate solution and saturated saline, and dried over magnesium sulfate. After filtration and concentration, purification was performed by column chromatography (ethyl acetate: hexane=8:2). 392.1 mg (0.978 mmol, 73%) of compound 4 was obtained as a result.

The NMR data of compound 4 is as follows.

$^1$H NMR (400 MHz, $CDCl_3$): δ 4.181(d, H-1, J 8.4 Hz), 3.254(t, —$CH_2$—$N_3$, J 6.8 Hz), 1.521 and 1.349 (2×Me of isopropylidene). $^{13}$C NMR (100 MHz, $CDCl_3$): δ 110.946 ($Me_2C$), 102.879(C-1), 79.50, 74.47, 74.22, 74.06, 70.70, 62.94, 52.032(—$CH_2$—$N_3$), 30.16, 29.97, 29.95, 29.93, 29.67, 29.38, 28.69(Me), 27.25, 26.93(Me), 26.50.

[Synthesis of Compound 5]

0.26 mL (2.16 mmol) of benzyl bromide (BnBr) and 52 mg (2.16 mmol) of sodium hydride (NaH) were added to 338.3 mg (0.84 mmol) of compound 4 dissolved in 20 mL of DMF, and then reacted at room temperature for two hours. After methanol was added to the reaction solution, the resulting mixture was evaporated, diluted with ethyl acetate, and then diluted with saturated saline. Purification was performed by column chromatography (ethyl acetate: hexane=4:6). 530.4 mg (quant.) of compound 5 was obtained as a result.

The NMR data of compound 5 is as follows.

$^1$H NMR (400 MHz, $CDCl_3$): δ 7.42-7.22 (m, 10H, aromatic), 4.851 (d, $CH_2$—$C_6H_5$, 11.6 Hz), 4.784 (d, $CH_2$—$C_6H_5$, 11.6 Hz), 4.638 (d, $CH_2$—$C_6H_5$, 11.6 Hz), 4.554 (d, $CH_2$—$C_6H_5$, 11.6 Hz), 4.295 (d, H-1, 8.0 Hz), 4.16-3.88 (m, H-2, H-3, H-4, H-5), 3.82-3.74 (m, H-6 and H-6'), 3.54-3.46 (m, —($CH_2$)—, 1H), 3.41-3.35 (m, —($CH_2$)—, 1H), 3.231 (t, —$CH_2$—$N_3$, J 7.2 Hz, 2H), 1.344 and 1.319 (s, 2×Me), 1.69-1.24 (m, —($CH_2$)—, 16H).

[Synthesis of Compound 6]

139.4 mg (0.6 mmol) of camphor sulfonic acid (CSA) was added to 508.2 mg (0.84 mmol) of compound 5 in 10 mL of methanol, and then reacted at room temperature for two hours. Triethylamine was added to the reaction solution and was evaporated. The mixture was diluted with ethyl acetate, washed with saturated saline, dried over magnesium sulfate, and then filtrated. Purification was performed by column chromatography (ethyl acetate: hexane=4:6). 387.1 mg (0.71 mmol, 84%) of compound 6 was obtained as a result.

The NMR data of compound 6 is as follows.

$^1$H NMR (400 MHz, CDCl$_3$): δ 7.38-7.25(m, aromatics, 10H), 4.965 (d, CH$_2$—C$_6$H$_5$, 11.6 Hz), 4.665 (d, CH$_2$—C$_6$H$_5$, 11.6 Hz), 4.59-4.56(m, CH$_2$-C$_6$H$_5$, 2H), 4.356(d, H-1, J 7.6 Hz), 4.00-3.92 (m, H-2 and H-4, 2H), 3.82-3.71 (m, H-6and H-6', 2H), 3.63-3.46 (m, H-3, H-5and —(CH$_2$)—, 4H), 3.235(t, —CH$_2$—N$_3$, J 7.2 Hz, 2H), 1.71-1.22 (m, —(CH$_2$)—, 16H). $^{13}$C NMR (100 MHz, CDCl$_3$): δ 139.08, 138.55, 129.04, 129.01, 128.65, 128.39, 128.33, 129.30, 104.25(C-1), 79.73, 75.13, 74.22, 73.92, 73.75, 70.53, 69.96, 69.56, 52.02 (—CH$_2$—N$_3$), 30.31, 30.03, 29.98, 29.96, 29.70, 29.39, 27.27, 26.72.

[Synthesis of Compound 7]

79.7 mg (0.32 mmol) of dibutyltin oxide (Bu$_2$SnO) was added to 157.3 mg (0.29 mmol) of compound 6 in 10 mL of toluene, subjected to azeotropic treatment four times, and then refluxed for two hours. After cooling to room temperature, 0.1 mL (0.87 mmol) of benzyl bromide (BnBr) and 48 mg (0.15 mmol) of tetrabutylammonium bromide (Bu$_4$NBr) were added to the solution, which was then reacted at room temperature for three hours. Ethyl acetate was added to the reaction solution, washed with saturated saline, dried over magnesium sulfate, and then filtered. Purification was performed by column chromatography (ethyl acetate: hexane=4:6). 170.7 mg (0.27 mmol, 93%) of compound 7 was obtained as a result.

The NMR data of compound 7 is as follows.

$^1$H NMR (400 MHz, CDCl$_3$): δ 7.39-7.25 (m, aromatics, 15H), 4.917 (d, CH$_2$—C$_6$H$_5$, 10.8 Hz), 4.723 (d, CH$_2$—C$_6$H$_5$, 10.8 Hz), 4.717 (s, CH$_2$—C$_6$H$_5$, 2H), 4.588 (s, CH$_2$—C$_6$H$_5$, 2H), 4.348(d, H-1, J 7.6 Hz), 4.016 (bs, H-4), 3.98-3.91 (m, H-3), 3.801 (dd, H-6, 6.0 and 10.0 Hz), 3.723 (dd, H-6', 6.0 and 10.0 Hz), 3.634 (dd, H-2, 8.0 and 9.2 Hz), 3.552 (bt, H-5, 6.0 Hz), 3.53-3.47 (m, —(CH$_2$)—, 2H), 3.240(t, —CH$_2$—N$_3$, J 7.2 Hz, 2H), 1.71-1.22 (m, —(CH$_2$)—, 16H). $^{13}$C NMR (125 MHz, CDCl$_3$): δ 139.26, 138.64, 138.54, 129.03, 129.01, 128.87, 128.68, 128.41, 128.36, 128.32, 128.18, 104.15 (C-1), 81.03, 79.44, 75.59, 74.14, 73.60, 72.82, 70.40, 69.69, 67.35, 52.03 (—CH$_2$—N$_3$), 30.34, 30.04, 30.00, 29.72, 29.41, 27.28, 26.74.

[Synthesis of Compound 8]

According to the literature (Austin, P. W., Hardy, F. E., Buchanan, J. G., Baddiley, J. *J. Chem. Soc.* 1965, 1419.), 2,3,4,6-tetra-O-benzyl-D-galactose (1 g, 1.85 mmol; T6412, Sigma), DMF (50 μL), and thionyl chloride (7 mL) were mixed and reacted at room temperature for six hours to produce 2,3,4,6-tetra-O-benzyl-α-D-galactopyranosyl chloride (1.06 g, quant.).

The resulting 2,3,4,6-tetra-O-benzyl-α-D-galactopyranosyl chloride (202.5 mg, 0.36 mmol) and 115.9 mg (0.18 mmol) of compound 7 were then dissolved in 20 mL of diethyl ether. 1 g of MS4A (drying agent) was added to the mixture, which was then stirred for one hour. 112 mg (0.54 mmol) of silver perchlorate (AgClO$_4$) was added to the solution, cooled to 0° C., and then reacted for 22 hours while gently heating to room temperature. Triethylamine was added to the reaction solution, which was then filtered through celite. Purification was performed by column chromatography (ethyl acetate: hexane=2:8). 133.6 mg (0.12 mmol, 67%) of compound 8 was obtained as a result.

The NMR data of compound 8 is as follows.

$^1$H NMR (400 MHz, CDCl$_3$): δ 7.40-7.16(m, aromatics, 35H), 5.029 (bs, H-1'), 4.93-4.87 (m, CH$_2$—C$_6$H$_5$, 3H), 4.81-4.76(m, CH$_2$—C$_6$H$_5$, 4H), 4.687 (d, CH$_2$—C$_6$H$_5$, 12.0 Hz, 1H), 4.547 (d, CH$_2$—C$_6$H$_5$, 11.6 Hz, 1H), 4.535(d CH$_2$—C$_6$H$_5$, 12.8 Hz, 1H), 4.46-4.42(m, H-5, 1H), 4.321 (d, H-1, 7.6 Hz), 4.264(d, CH$_2$—C$_6$H$_5$, 12.0 Hz, 1H), 4.216(d, CH$_2$—C$_6$H$_5$, 11.6 Hz, 1H), 4.16-4.10(m, H-2', H-4', H-5' and CH$_2$—C$_6$H$_5$, 5H), 4.025-4.018(bd, H-4, 2.8 Hz, 1H), 3.989-3.907(m, H-3' and —O—CH$_2$—(CH$_2$)—, 2H), 3.674 (dd, H-2, 7.6 and 10.0 Hz), 3.575-3.456(m, H$_6$a, H$_6$'a, H$_6$'b and —O—CH$_2$—(CH$_2$)—, 4H), 3.382(dd, H-3, 2.8 and 10.0 Hz), 3.262-3.194(m, H-6 and —CH$_2$—N$_3$, 3H), 1.71-1.26 (m, —(CH$_2$)—, 16H). $^{13}$C NMR (100 MHz, CDCl$_3$): δ 138.929, 138.753, 138.715, 138.646, 138.089, 138.012, 128.294, 128.210, 128.164. 128.058, 127.996, 127.767, 127.553, 127.507, 127.400, 127.286, 103.946(C-1), 100.401 (C-1'), 80.828, 78.918, 76.488, 75.044, 74.838, 74.746, 74.662, 73.692, 73.524, 73.111, 72.989, 72.301, 72.233, 70.139, 69.207, 67.954, 67.893, 51.383(—CH$_2$—N$_3$), 29.724, 29.403, 29.365, 29.067, 28.754, 26.622, 26.072.

[Synthesis of Compound 9]

49.0 mg (0.042 mmol) of compound 8 was dissolved in 2 mL of ethyl acetate and 5 mL of methanol, palladium hydroxide [Pd(OH)$_2$] was added to the solution, and the reaction was performed under hydrogen atmosphere (50 kgf/cm$^2$) for four hours, followed by filtration. 18.0 mg (0.036 mmol, 85%) of the target product was obtained as a result.

The NMR data of compound 9 is as follows.

$^1$H NMR (400 MHz, CD$_3$OD): δ 4.976(bs, H-1'), 4.311(t, H-5', 6.0 Hz), 4.280(d, H-1, 7.6 Hz), 4.007(d, H-4', 2.8 Hz), 3.931(bs, H-4), 3.622(bt, H-5, 6.4 Hz), 3.466(dd, H-2, J 7.6 and 10.0 Hz), 2.917(t, —CH$_2$—NH$_2$, J 7.2 Hz), 1.66-1.28 (m, —(CH$_2$)—, 16H). $^{13}$C NMR (100 MHz, CD$_3$OD): δ 105.995(C-1), 103.291(C-1'), 79.738, 76.927, 75.536, 73.688, 73.374, 72.175, 71.923, 71.610, 63.466, 61.739, 41.670(—CH$_2$—NH$_2$), 31.670, 31.372, 31.311, 31.204, 31.013, 29.401, 28.294, 27.866.

EXAMPLE 2

Synthesis of Compound 11

[Production of Ionic Polymer]

As shown in FIG. 2, 4.6 mg (0.01 mmol) of the compound 9 obtained as described above and 1.2 mg (approximately 0.01 mmol of the maleic anhydride unit) of poly(ethylene-alt-maleic anhydride) (Aldrich, 18805-0: Mw 100,000 to 500,000) 10 were dissolved in DMF, and then reacted at 80° C. for 25 hours. The reaction solution was evaporated, dissolved in water, and then dialyzed to produce 4.2 mg of the target ionic polymer (sugar chain polymer) 11. According to $^1$H-NMR data, the sugar chain content is estimated at approximately 12%. Therefore, carboxylic acid content is regarded as approximately 88%. This $^1$H-NMR spectrum, in which each of the signals was broad, was clearly different from the NMR spectrum of compound 9. For SPR measurements, a sample prepared with compounds 9 and 10 in a ratio of 2:1 was used.

The NMR data of the ionic polymer is as follows.

$^1$H NMR (400 MHz, D$_2$O): δ 4.829(d, H-1', 3.6 Hz), 4.315(d, H-1, 7.6 Hz), 4.238(bt, H-5'), 2.415(m, —(CH$_2$)$_2$—, 8H), 1.7-1.1(m, —CH(COOH)—CH (CONH—)— and —(CH$_2$)—).

EXAMPLE 3

Detection of Verotoxins Using Gb2 Polymer Immobilized by Ionic Bonds

[Production of a Sensor Chip]

The gold substrate of SIA kit Au, commercially available from Biacore, was cleaned using an ozone cleaner and immersed in 4 mM β-mercaptopropionic acid-ethanol solution at room temperature for four hours. The substrate was then washed with ethanol and water, and a sensor chip was assembled to prepare surface A as shown in FIG. 2.

[Immobilization of Gb2 Polymer]

In order to measure compound adsorption to the sensor chip, the chip was placed into Biacore 3000 (brand name: Biacore), and subjected to water flow at a flow rate of 1 μL/min. After the sensorgram stabilized, 10 μL of 100 μg/mL polycation (Poly(diallyldimethylammonium chloride); Aldrich, 40903-0, Mw 400,000 to 500,000) comprising the component unit as shown in FIG. 2 in 10 mM acetate buffer ($pH_{4.5}$) was injected.

Figure 4:
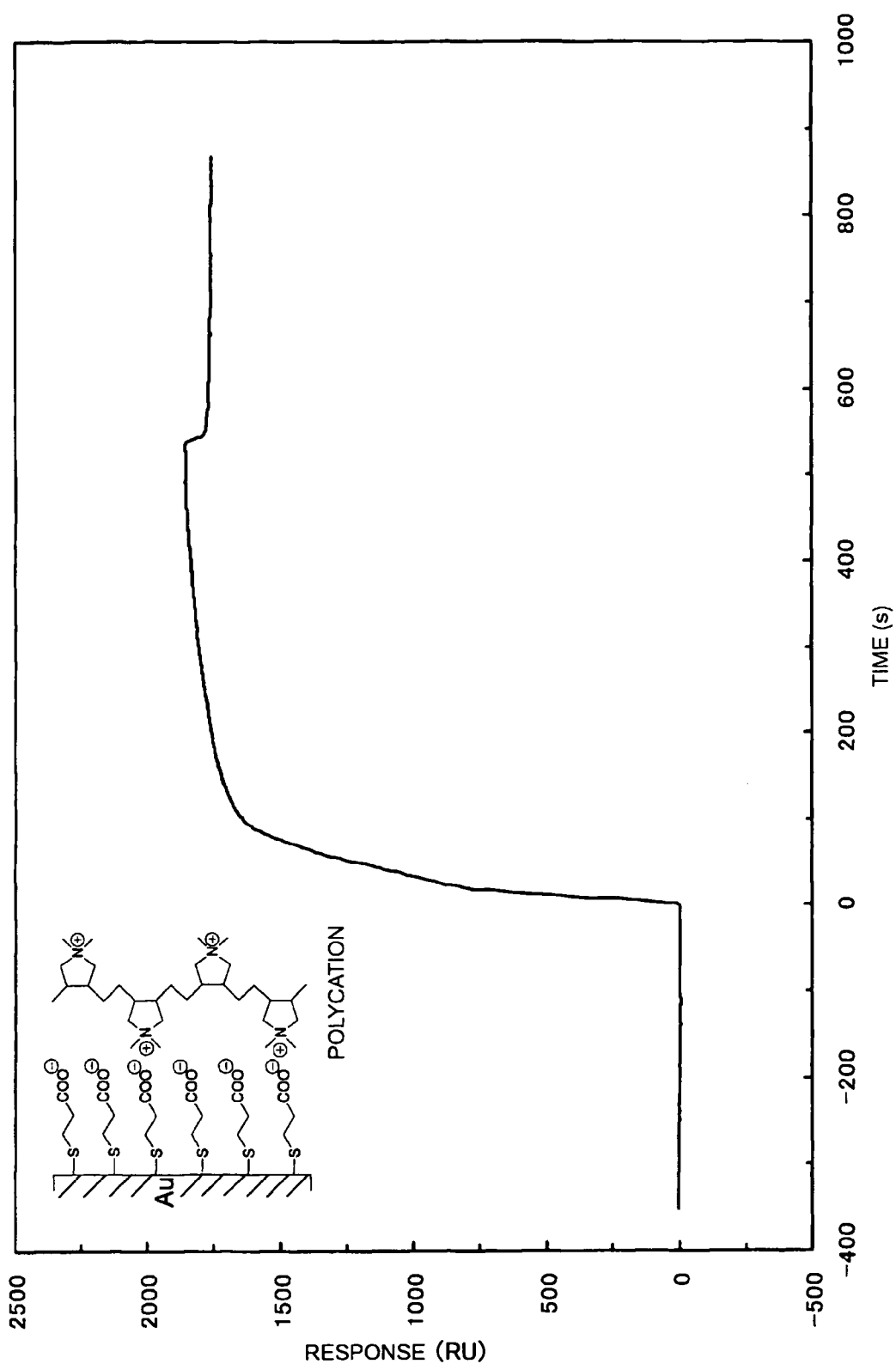
FIG. 4 is a graph obtained by measuring responses when polycations are ionically bound to a gold substrate. More specifically, it is the surface plasmon resonance (SPR) spectrum when polycations are accumulated by ionic bonds to a gold surface pretreated with 3-mercaptopropionic acid, and is the first layer of the gold surface subjected to ionic bond immobilization. The conditions for polycation immobilization are as follows: 100 μg/mL polycation in 10 mM acetate buffer at pH4.5.

As a result, as shown in FIG. 4, 1750 RU of the polycation was confirmed to be immobilized onto the gold surface, indicating the formation of surface B in FIG. 2.

Figure 5:
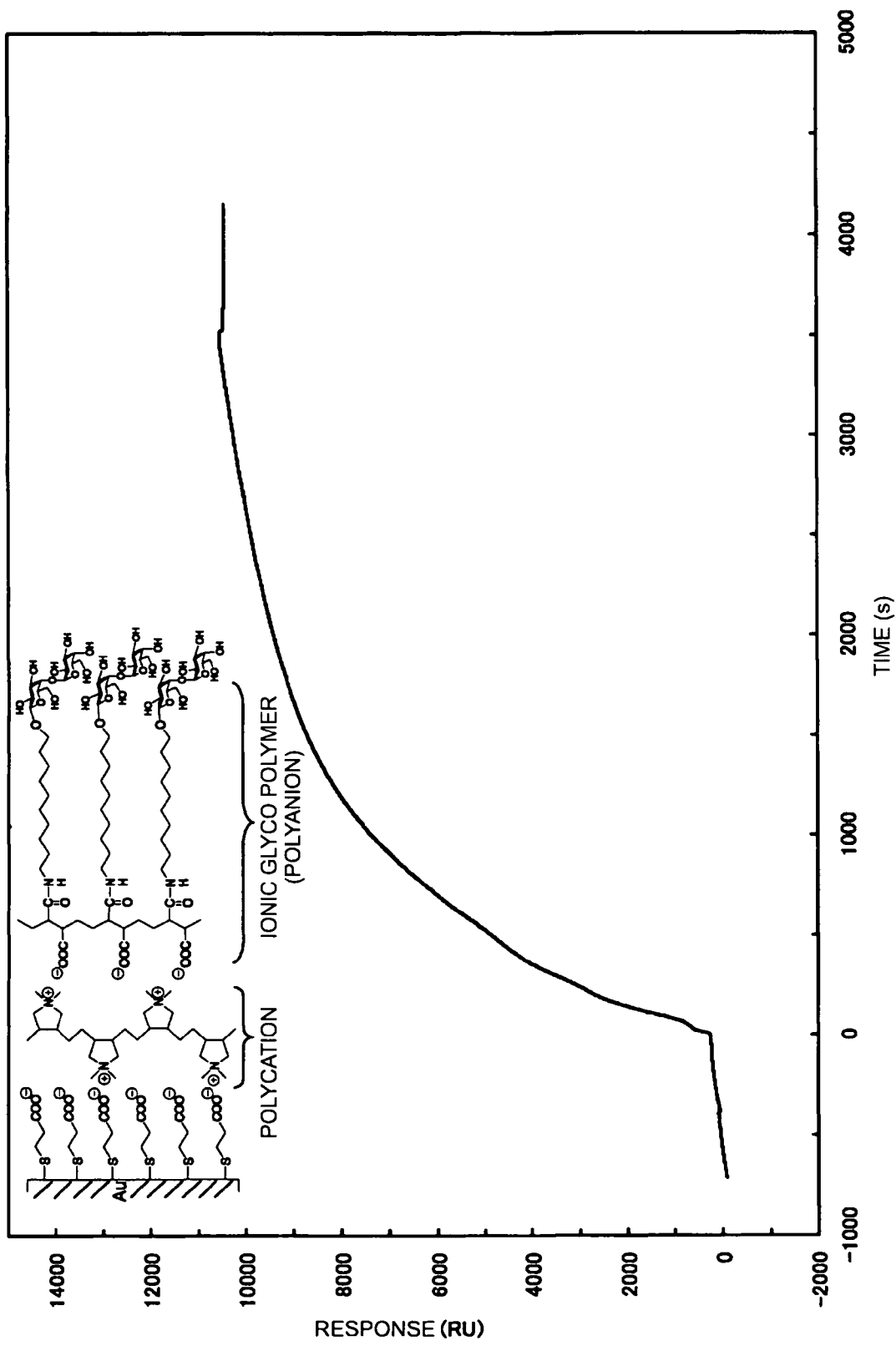
FIG. 5 is a graph obtained by measuring the response when the ionic polymers are further ionically bound to the gold surface to which the polycations were ionically bound. More specifically, it is the SPR spectrum when ionic polymers 11 were immobilized onto the surface described in FIG. 4, and is the second layer of the gold surface subjected to ionic bond immobilization. The conditions for immobilization of the ionic polymers (polyanions) are as follows: 100 μg/mL Gb2 polymer in 10 mM acetate buffer at pH4.5.

Next, the ionic polymer (Gb2 polymer) 11 synthesized as shown above was dissolved at 100 μg/mL in 10 mM acetate buffer ($pH_{4.5}$). 60 μL of this solution was injected onto a gold surface comprising surface B onto which the polycation was immobilized. As a result, as shown in FIG. 5, 10,000 RU of compound 11 was confirmed to be immobilized onto surface B (sugar chain polymer-comprising gold substrate).

Herein, "RU" is an abbreviation of "resonance unit", and denotes a value that increases depending on the amount of substance that is adsorbed, attached, or immobilized onto the substrate surface. According to one supplier, Biacore, 1 RU=approximately 1 $pg/mm^2$.

[SPR Measurements]

For measuring MPA (*Maclura pomifera*-derived α-Gal recognition protein: lectin, Sigma, for comparative studies) and verotoxin, the bulk effect and the effects of non-specific adsorption were eliminated by using a flow cell without sugar chain polymers as a blank control, and subtracting this sensorgram from the sensorgram obtained by using a flow cell to which the ionic polymer 11 was immobilized.

Measurements were carried out at 25° C., at a flow rate of 5 μL/min, using 10 mM HEPES buffer ($pH_{7.4}$, 150 mM NaCl, 0.005% surfactant P20) as the running buffer.

Figure 6:
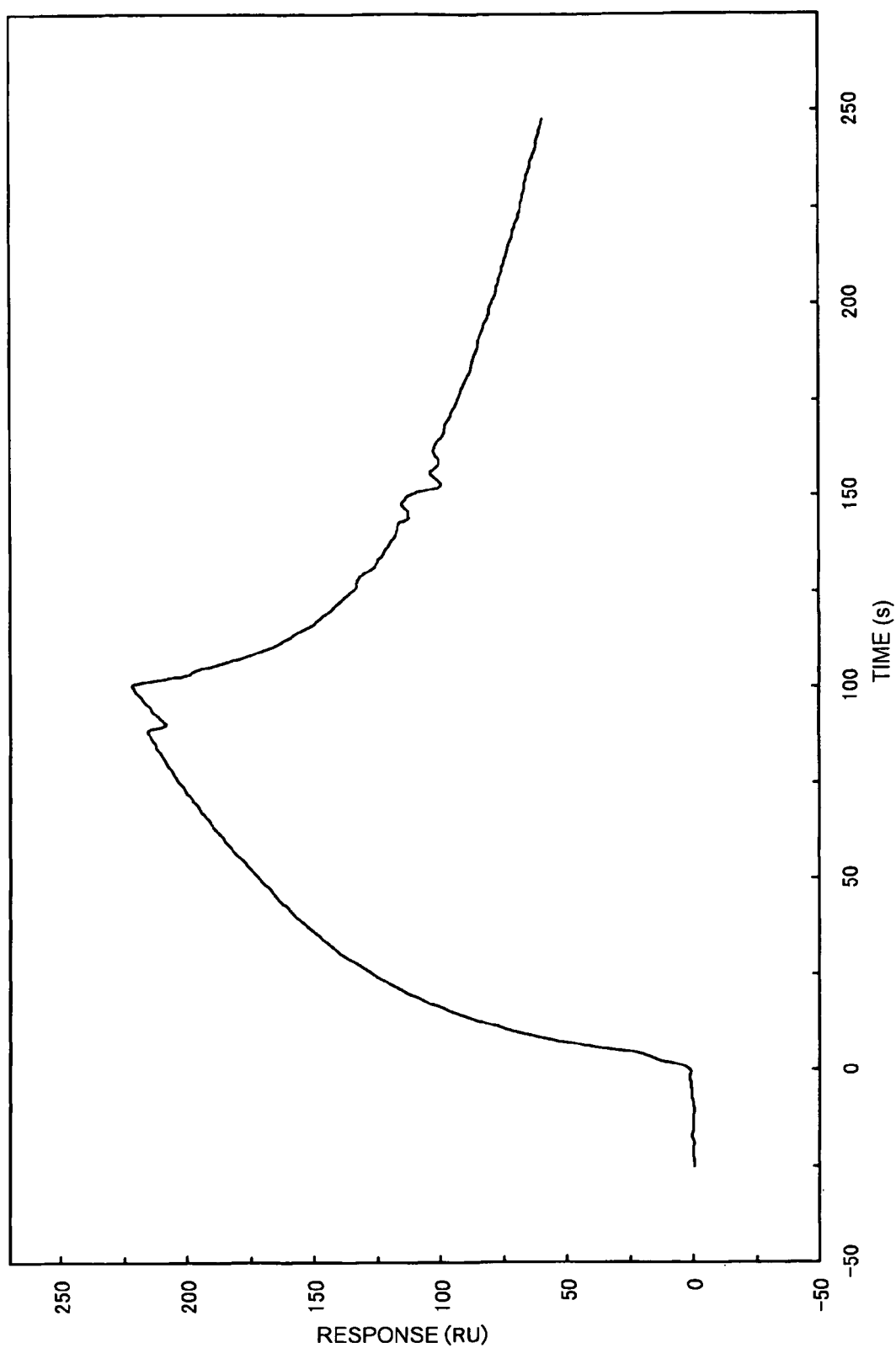
FIG. 6 is a graph obtained by measuring the response of lectin when the gold substrate indicated in FIG. 5, to which ionic polymers were ionically bound, was treated with lectin (*Maclura pomifera* agglutinin (MPA): α-Gal recognition protein). More specifically, this is a binding experiment using a standard protein (MPA) when using the surface indicated in FIG. 5 (to which ionic polymer 11 was immobilized using ionic bonds). The concentration of MPA was 10 μg/mL (232 nM).

After the sensorgram stabilized, 10 μL (232 nM) of 10 μg/mL MPA solution was injected. As a result, approximately 220 RU of lectin bound to the synthesized sugar chain polymer-comprising gold substrate, as shown in FIG. 6.

The sample of verotoxin-1 was prepared by the method shown below:

The verotoxin-1 used in the present study was derived from *E. coli* GPU994.The strain was a verotoxin-1 gene knockout mutant of Enterohemorrhagic *E. coli* GPU96MM (O-157: $H_7$), a clinical isolate producing the toxin. The toxin was prepared as described in another paper. Briefly, culture supernatant of *E. coli* GPU994 producing verotoxin-1 alone was precipitated by 80% $(NH_4)_2SO_4$ saturation. The precipitate was dissolved and dialyzed against 50 mM Tris-HCl buffer ($pH_{8.6}$), and then filtrated through 0.22 μm filter to be used as verotoxin-1 sample specimen. When assaying cytotoxicity in the verotoxin-1 sample as the activity of reducing HeLa cell growth by 50% in 48 hours of cultivation ($CD_{50}$), the sample showed an activity of $5.1 \times 10^5$ $CD_{50}$/mg protein. The purity of the sample was estimated to be approximately 3 w/w % of total protein, calculated based on data reported by others (see, D. W. K. Acheson, M. Jacewicz, A. V. Kane, A. D.-Rolfe and G. T. Keusch, *Microb. Pathog.*, 1993, 14, 57., S. Ashkenazi and T. G. Cleary, *J. Clin. Microbiol.*, 1989, 27, 1145.). The crude sample was then further purified using the affinity chromatography to obtain ca. 100% of verotoxin-1, which was used in the study.

Figure 7:
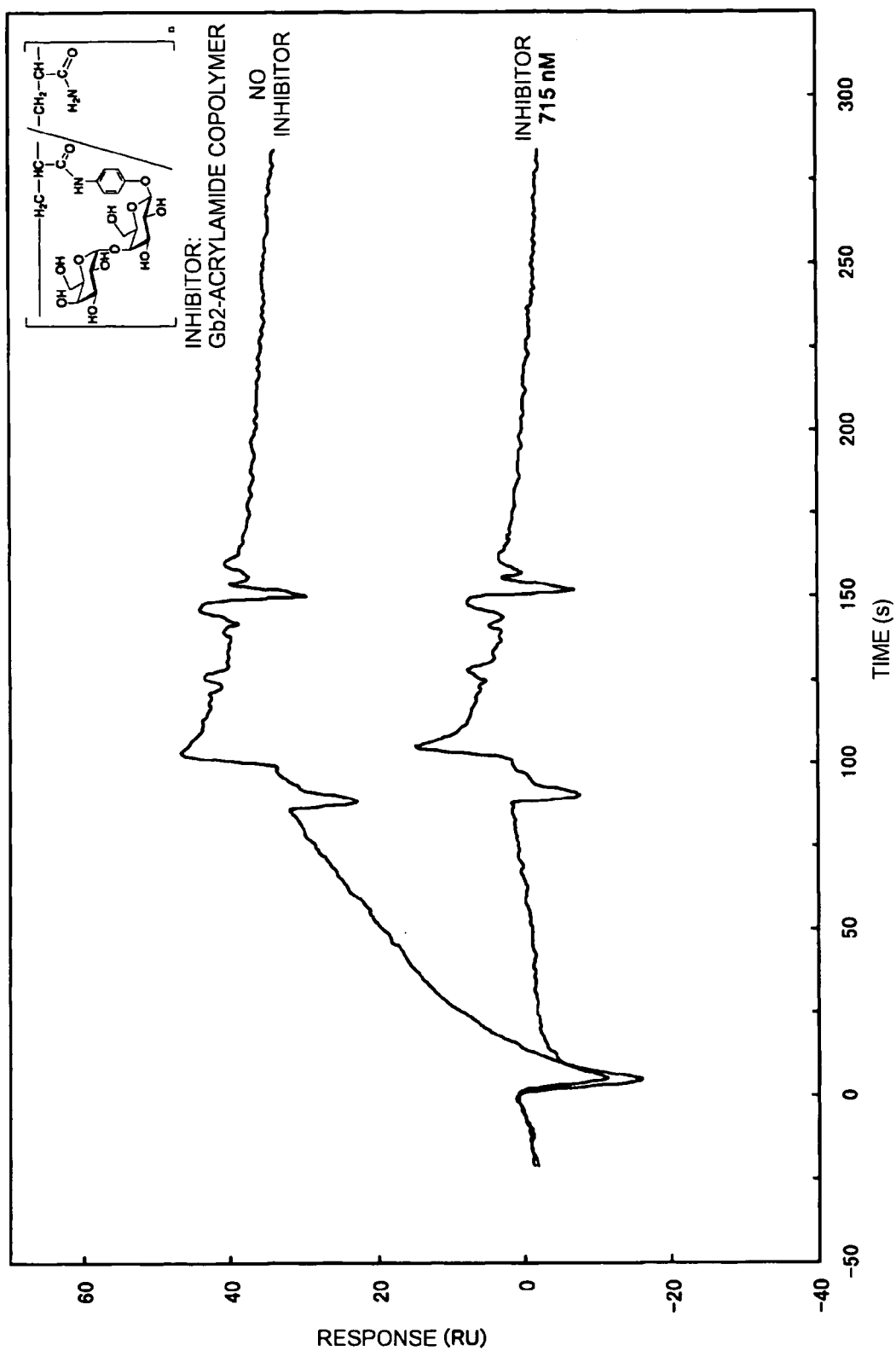
FIG. 7 is a graph obtained by measuring the response of verotoxin when the gold substrate indicated in FIG. 5, to which ionic polymers were ionically bound, was treated with verotoxin-1;and by measuring the response of verotoxin when a verotoxin inhibitor was added. More specifically, it shows a binding and inhibition experiment using verotoxin-1.The concentration of verotoxin-1 used was 5 μg/mL (71.5 nM). Gb2-ac The aforementioned sugar chains comprise oligosaccharides and polysaccharides.

As described above, a 100% pure verotoxin-1 sample was prepared from a genetically-engineered knockout strain (this sample did not comprise any verotoxin-2, nor other interferent proteins). The verotoxin used herein is all verotoxin-1 (herein, referred to as verotoxin, verotoxin type 1, verotoxin-1, etc.). 10 μL of the verotoxin-1, diluted in HEPES buffer to 5 μg/mL (71.5 nM), was used for injection. As a result, approximately 40 RU of verotoxin bound to the sugar chain polymer-comprising gold substrate, as shown in FIG. 7. On the other hand, the binding signal did not change when injection was performed by using a 5mg/mL (71.5 nM) verotoxin solution to which was added 715 nM (Gb2 unit) Gb2 acrylamide copolymer, which inhibits the adsorption of verotoxin (Dohi, H., Nishida, Y., Tanaka, H., Kobayashi, K. *Synlett* 2001, 1446-1448). Thus inhibitory effect was confirmed.

Thus, verotoxin-1 does not bind to the substrate surface by non-specific adsorption, but by specific binding through the sugar chains on the substrate surface.

EXAMPLE 4

Detection of Verotoxin by Covalently Immobilized Gb2 Polymer

[Construction of a Sensor Chip]

The gold substrate of SIA kit Au, commercially available from Biacore, was cleaned using an ozone cleaner and immersed in 4 mM 6-amino-1-hexanethiol hydrochloride (Dojin Chemicals) in ethanol at room temperature for four hours. The substrate was then washed with ethanol and water, and the sensor chip was assembled.

[Immobilization]

Figure 8:
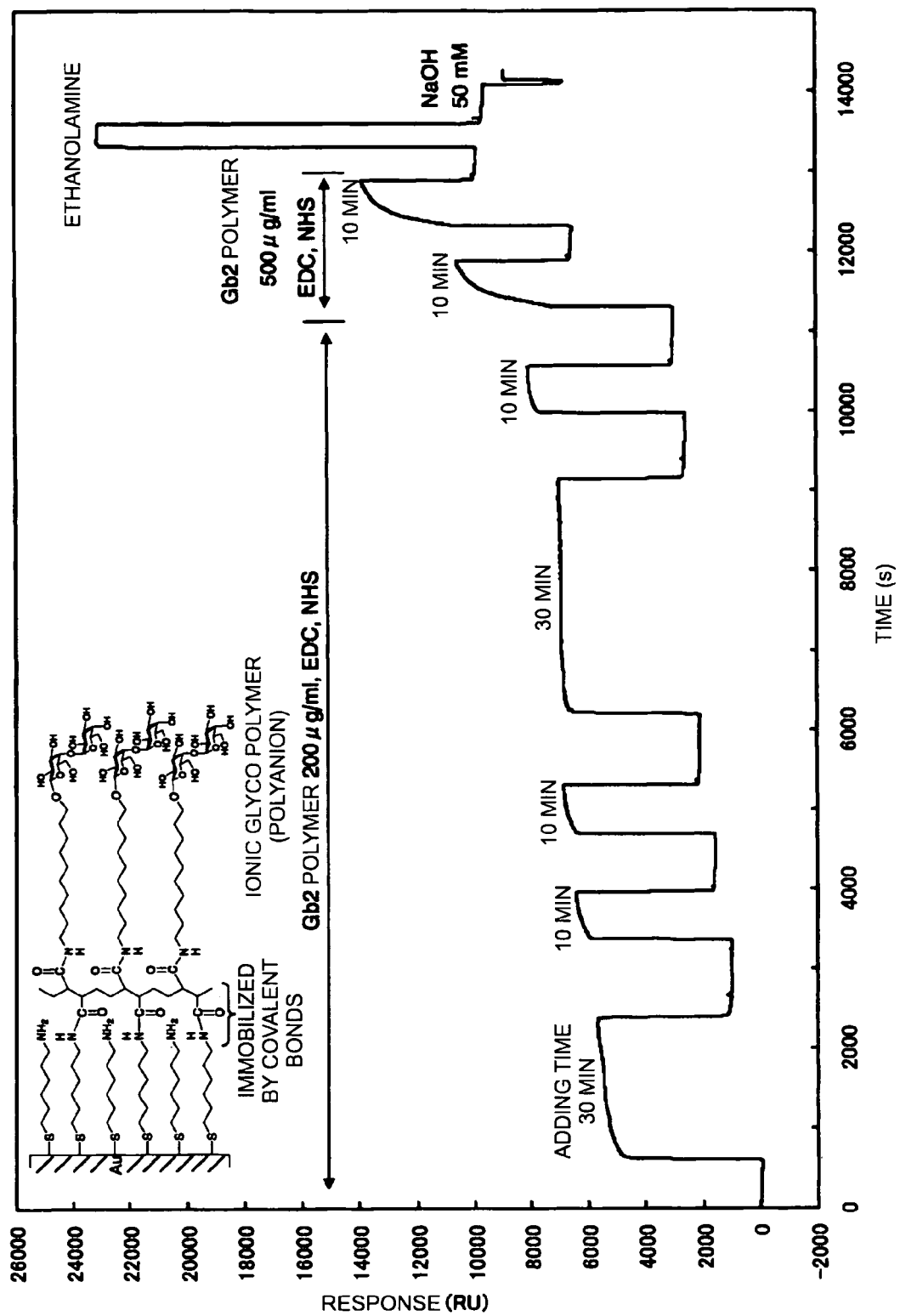

The sensor chip was placed in Biacore 3000, and water was flowed. After the sensorgram stabilized, 200 μg/mL of the above-described aqueous solution of Gb2 polymer 11, which was activated using N-ethyl-N'-(3-dimethylaminopropyl) carbodiimide hydrochloride (EDC) (Biacore) and N-hydroxysuccinimide (NHS) (Biacore), was injected. This procedure was repeated five times, and injection was further repeated twice using the solution adjusted to 500 μg/mL. Finally, the remaining NHS groups were blocked with ethanolamine, and washing was then performed using 50 mM NaOH. As a result, a sugar chain polymer-comprising gold substrate, to which approximately 8,800 RU of Gb2 polymer 11 was ultimately immobilized, was obtained, as shown in FIG. 8.

As a blank control, polyanion (poly(ethylene maleic acid)) to which sugar chains were not bound was covalently immobilized to the flow cell as described above.

[SPR Measurements]

Measurements were carried out at 25° C., at a flow rate of 5 μL/min, and using 10 mM HEPES buffer ($pH_{7.4}$;comprising 150 mM NaCl and 0.005% surfactant P20) as the running buffer.

Figure 9:
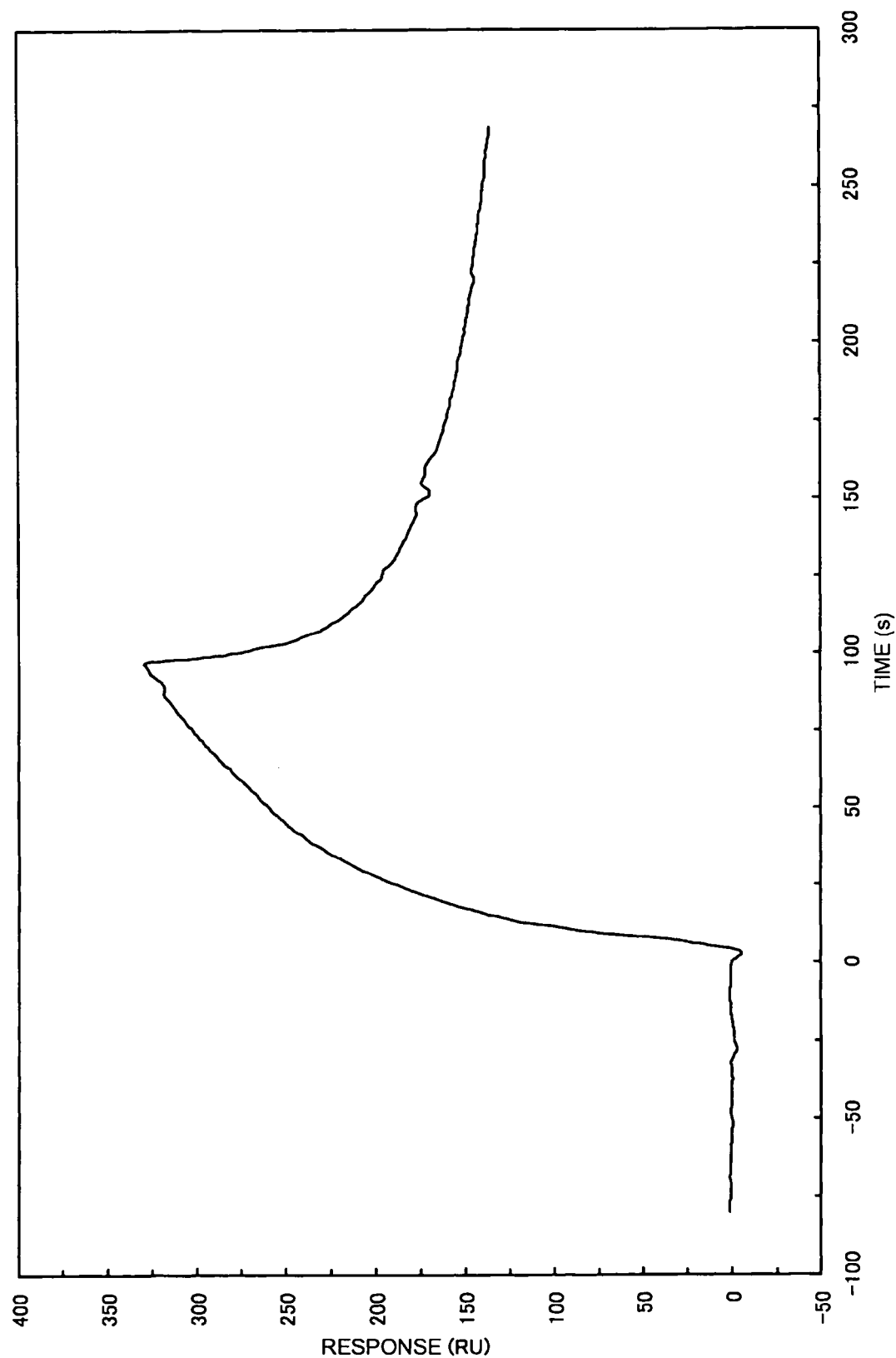

As a result of injecting 10 μL of 10 μg/mL (232 nM) MPA solution, approximately 330 RU of MPA was confirmed to bind to the sugar chains, as shown in FIG. 9.

Figure 10:
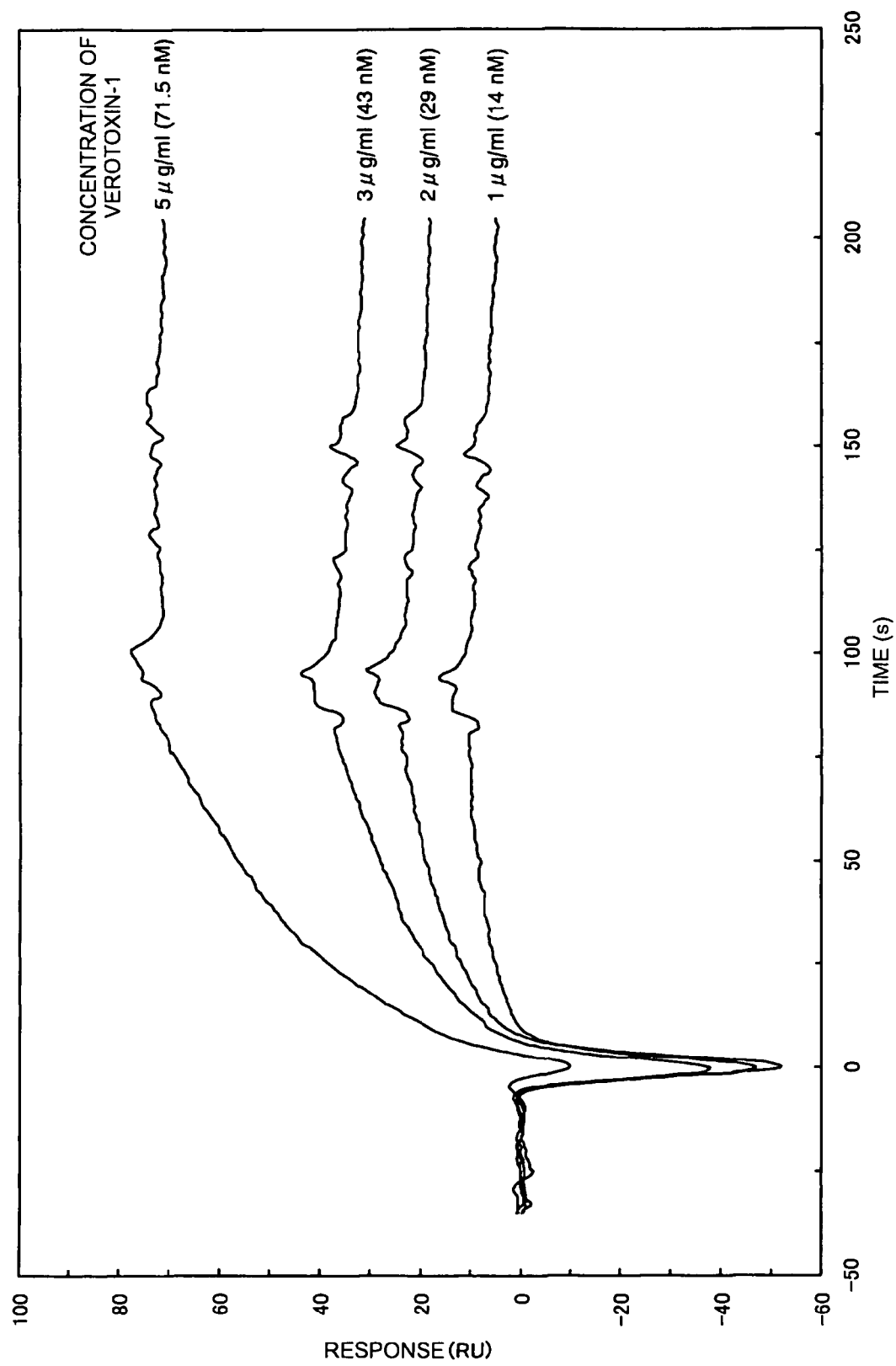

5 μg/mL (71.5 nM), 3 μg/mL (43 nM), 2 g/mL (29 nM), and 1 μg/mL (14 nM) solutions of 100% pure verotoxin-1 in 10 mM HEPES buffer were prepared, and 10 μL of each of these solutions was injected. As a result, approximately 75 RU, 40 RU, 25 RU, and 10 RU of verotoxin, respectively, bound to the sugar chain, as shown in FIG. 10.

Figure 11:
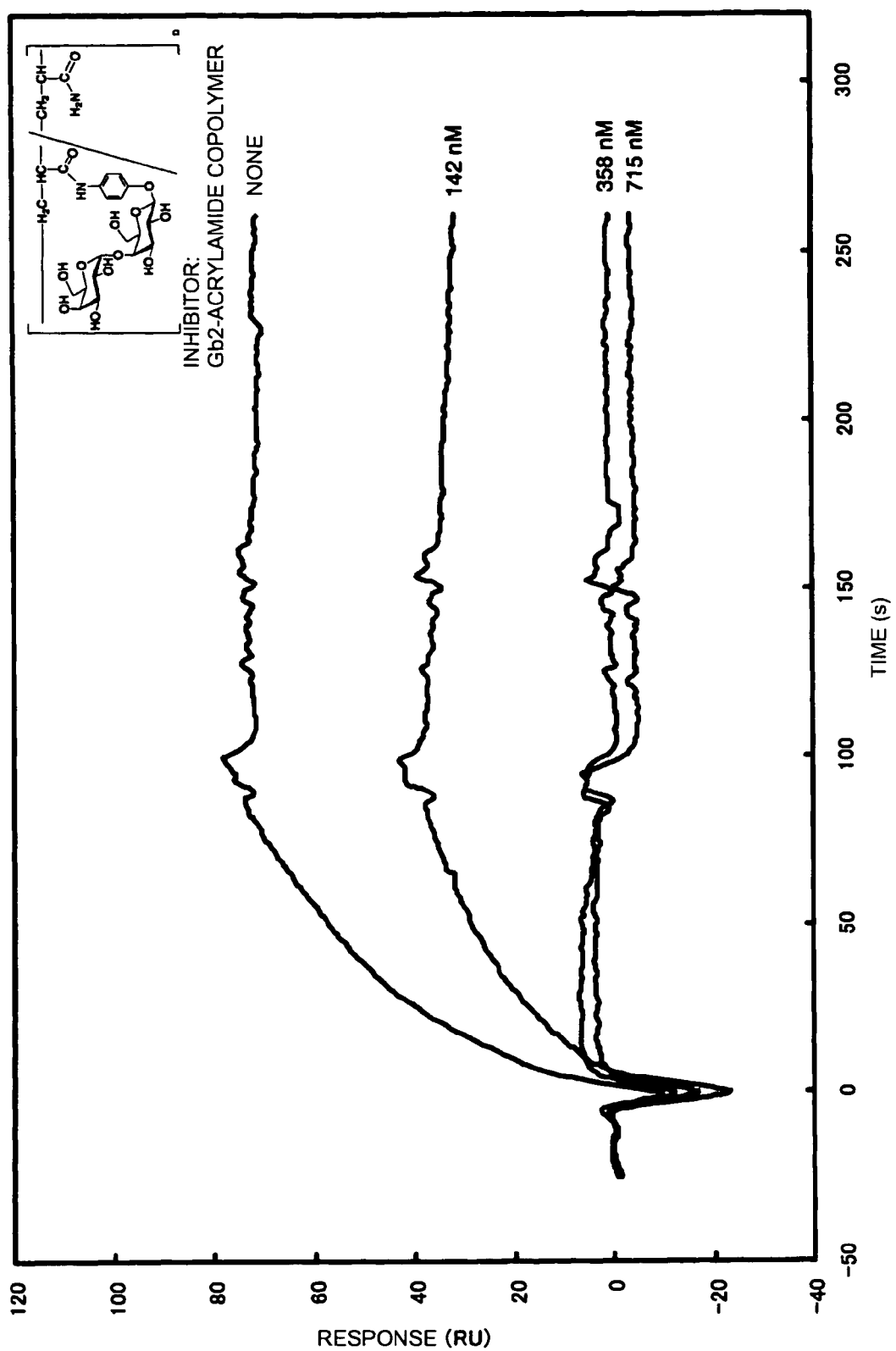

The amount of binding gradually decreased when 5 μg/mL (71.5 nM) of verotoxin was mixed with Gb2 acrylamide copolymer, an inhibitor, at various concentrations, 142 nM, 358 nM, and 715 nM (Gb2 unit), and then injected. Complete inhibitory effect was observed at 715 nM, as shown in FIG. 11.

EXAMPLE 5

Experiments on Peel Strength

Durability experiments (peel experiments) were performed for the ionic sugar chain polymer (polyanion) in the second layer when using the surface (to which ionic polymer 11 was immobilized by ionic bonds) indicated in FIG. 5.

Figure 12:
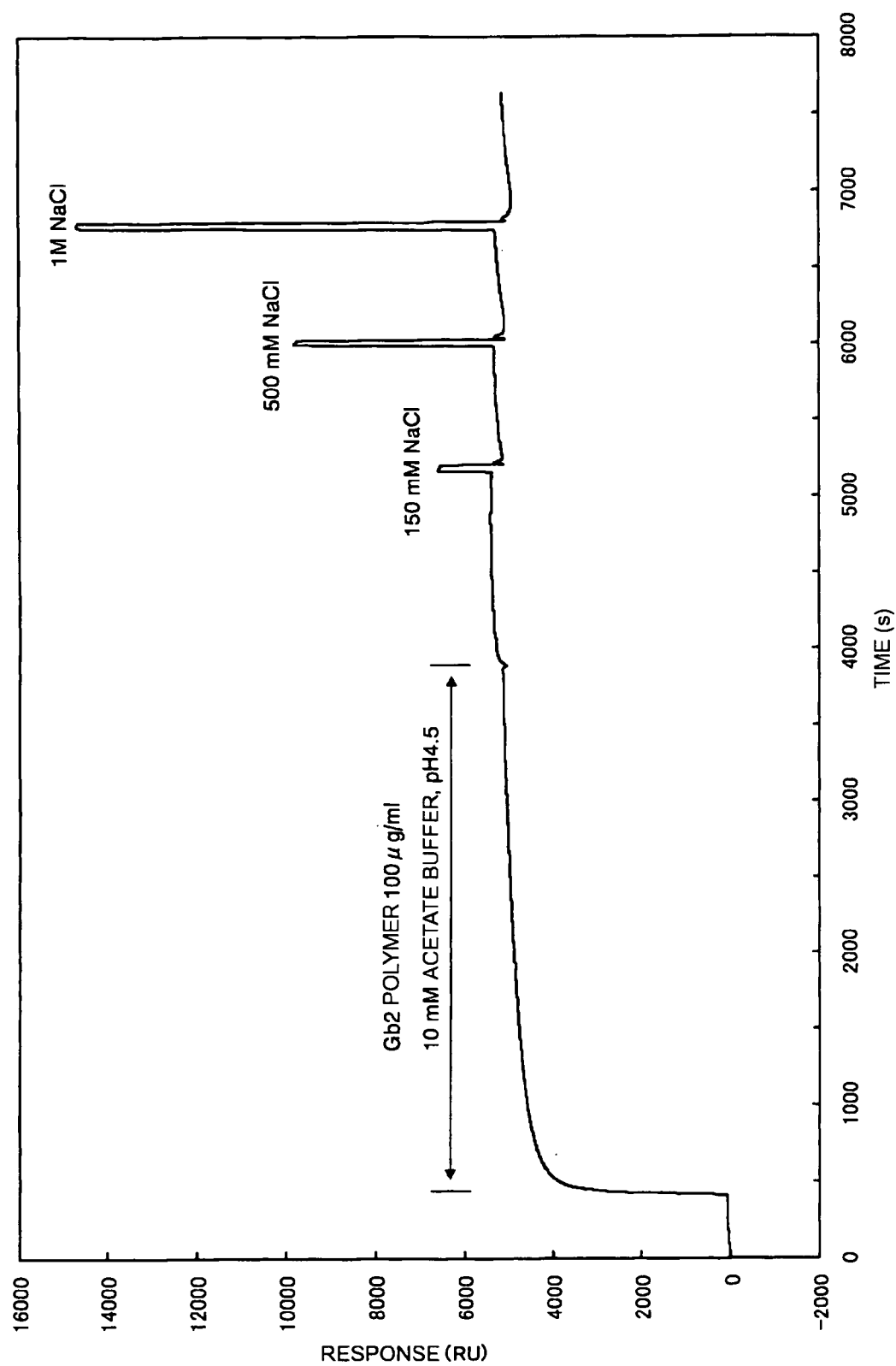

By a method similar to that described above, polycations were immobilized in the first layer, and Gb2 polymer 11 was immobilized in the second layer. Then, 150 mM, 500 mM, and 1 M aqueous NaCl solutions were injected for one minute. As a result, peel of Gb2 polymer 11 was hardly observed at any of these concentrations. These results are shown in FIG. 12.

What is claimed is:

1. A substrate for detecting *E. coli* O-157 or verotoxins, which comprises an ionic polymer bound thereto through two or more ionic bonds, wherein the ionic polymer whose main chain polymer comprises a substituted or unsubstituted hydrocarbon backbone or poly-amino-acid-derived backbone, which comprises a component unit (I) represented by formula (3)

$$\left(Z^2-\underset{R^2}{\underset{|}{C}}-\underset{R^3}{\underset{|}{C}}\right) \quad (3)$$

wherein L denotes disaccharide units (Galα1-4 Galβ1—O—) represented by formula (6)

(6)

which are capable of interacting with *E. coli* O-157 or verotoxins;

X denotes a spacer, wherein the X comprises a hydrophobic group comprising a linear alkylene group of 8 to 12 carbon atoms;
B denotes an amide bond;
A denotes an ionic functional group, which is a carboxylate;
each of $R^2$ and $R^3$ denote a hydrogen atom; and
$Z^2$ denotes ethylene.

2. A substrate for detecting *E. coli* O-157 or verotoxins, which comprises an ionic polymer bound thereto through two or more ionic bonds, wherein the ionic polymer whose main chain polymer comprises a substituted or unsubstituted hydrocarbon backbone or poly-amino-acid-derived backbone, which comprises a component unit (I) represented by formula (3)

$$\left(Z^1-\underset{R^1}{\underset{|}{C}}\right) \quad (2)$$

wherein L denotes trisaccharide units (Galα1-4Galβ1-4Glcβ1 —O—) represented by formula (7)

(7)

which are capable of interacting with *E. coil* O-157 or verotoxins;
X denotes a spacer, wherein the X comprises a hydrophobic group comprising a linear alkylene group of 8 to 12 carbon atoms;
B denotes an amide bond;
A denotes an ionic functional group, which is a carboxylate;
each of $R^2$ and $R^3$ denote a hydrogen atom; and
$Z^2$ denotes ethylene.

3. A substrate for detecting botulinum toxin B, which comprises an ionic polymer bound thereto through two or more ionic bonds, wherein the ionic polymer whose main chain polymer comprises a substituted or unsubstituted hydrocarbon backbone or poly-amino-acid-derived backbone, which comprises a component unit (I) represented by formula (3)

$$\left(Z^1-\underset{R^1}{\underset{|}{C}}\right) \quad (2)$$

wherein L denotes a heptasaccharide ligand represented by formula (8)

(8)

which is capable of interacting with botulinum toxin B;
X denotes a spacer, wherein the X comprises a hydrophobic group comprising a linear alkylene group of 10 to 15 carbon atoms;
B denotes an amide bond;
A denotes an ionic functional group, which is a carboxylate;
each of $R^2$ and $R^3$ denote a hydrogen atom; and
$Z^2$ denotes ethylene.

* * * * *

UNITED STATES PATENT AND TRADEMARK OFFICE
CERTIFICATE OF CORRECTION

PATENT NO.      : 7,288,416 B2
APPLICATION NO. : 10/851480
DATED           : October 30, 2007
INVENTOR(S)     : Uzawa et al.

It is certified that error appears in the above-identified patent and that said Letters Patent is hereby corrected as shown below:

On the cover, under References Cited:

Please add --JP 2001-342197 12/11/2001 to Uzawa *et al.*--

Column 1, line 18, "1982.In" should be --1982. In--

Column 1, line 19, "1997,leading" should be --1997, leading--

Column 4, line 34, "and Z" should be --and $Z^2$--

Column 5, line 54, "verotoxin-1;and" should be --verotoxin-1; and--

Column 5, line 57, "verotoxin-1.The" should be --verotoxin-1. The--

Column 8, line 61, "20,and" should be --20, and--

Column 8, line 64, "O-157,spacer" should be --O-157, spacer--

Column 9, line 9, "botulinum,for" should be --botulinum, for--

Column 9, line 37, "-$SO_2$-N-R-(polymer);" should be -- -$SO_2$-NH-R-(polymer);--

Column 10, line 17, "A cat group" should be --A cationic functional group--

Column 10, line 42, "and more" should be --; and more--

Column 17, line 47, "20,or more" should be --20, or more--

Column 17, line 47, "12.Y" should be --12. Y--

Column 17, line 48, "5,000.R" should be --5,000. R--

Column 18, line 24, "20, and more preferably 8 to 12.M" should be --20, and more preferably 8 to 12. M--

Column 22, line 5, "5.The" should be --5. The--

Column 22, line 36, "1.5molar" should be --1.5 molar--

Column 22, line 38, "compound 7.These" should be --compound 7. These--

UNITED STATES PATENT AND TRADEMARK OFFICE
CERTIFICATE OF CORRECTION

PATENT NO. : 7,288,416 B2
APPLICATION NO. : 10/851480
DATED : October 30, 2007
INVENTOR(S) : Uzawa et al.

It is certified that error appears in the above-identified patent and that said Letters Patent is hereby corrected as shown below:

Column 35, line 57, "4.452(d" should be --4,452 (d--

Column 35, line 59, "3.44(m" should be --3.44 (m--

Column 35, line 60, "3.407(t" should be --3.407 (t--

Column 36, line 9, "4.453(d," should be --4.453 (d,--

Column 36, line 12, "3.256(t," should be --3.256 (t,--

Column 36, line 34, "4.181(d" should be --4.181 (d,--

Column 36, line 35, "3.254(t" should be --3.254 (t,--

Column 37, line 5, "7.25(m," should be --7.25 (m,--

Column 37, line 7, "4.56(m," should be --4.56 (m,--

Column 37, line 7, "4.356(d," should be --4.356 (d,--

Column 37, line 9, "H-6and" should be --H-6 and--

Column 37, line 9, "H-5and" should be --H-5 and--

Column 37, line 10, "3.235(t," should be --3.235 (t,--

Column 37, line 34, "4.348(d," should be --4.348 (d,--

Column 37, line 38, "3.240(t," should be --3.240 (t,--

Column 37, line 66, "7.16(m," should be --7.16 (m,--

Column 38, line 1, "4.76(m," should be --4.76 (m,--

Column 38, line 2, "4.535(d" should be --4.535 (d,--

Column 38, line 3, "4.42(m," should be --4.42 (m,--

Column 38, line 4, "4.264(d," should be --4.264 (d,--

UNITED STATES PATENT AND TRADEMARK OFFICE
CERTIFICATE OF CORRECTION

PATENT NO. : 7,288,416 B2
APPLICATION NO. : 10/851480
DATED : October 30, 2007
INVENTOR(S) : Uzawa et al.

It is certified that error appears in the above-identified patent and that said Letters Patent is hereby corrected as shown below:

Column 38, line 4, "4.216(d," should be --4.216 (d,--

Column 38, line 5, "4.10(m," should be --4.10 (m,--

Column 38, line 6, "4.018(bd," should be --4.018 (bd,--

Column 38, line 7, "3.907(m," should be --3.907 (m,--

Column 38, line 8, "3.456(m, $H_6$a, $H_6$'a, $H_6$'b" should be --3.456 (m, $H_6$a, $H_6$'a, $H_6$'b--

Column 38, line 9, "3.382(dd," should be --3.382 (dd,--

Column 38, line 10, "3.194(m," should be --3.194 (m,--

Column 39, line 21, "$pH_{4.5}$" should be --pH 4.5--

Column 39, line 27, "$pH_{4.5}$" should be --pH 4.5--

Column 39, line 47, "$pH_{7.4,150}$" should be --pH 7.4, 150--

Column 39, line 57, "GPU994.The" should be --GPU994. The--

Column 39, line 59, "(O-157:$H_7$)" should be --(O-157:H7)--

Column 39, line 64, "($pH_{8.6}$)" should be --(pH 8.6)--

Column 40, line 5, "A.D.-Rolfe" should be --A.D. Rolfe--

Column 40, line 6, "57.," should be --57.;--

Column 40, line 20, "5mg/mL" should be --5 mg/mL--

Column 40, line 62, "($pH_{7.4}$;comprising" should be --pH 7.4; comprising--

Column 41, line 1, "2g/mL" should be --2 µg/mL--

Column 42, line 43, "*E. coil*" should be --*E. coli*--

UNITED STATES PATENT AND TRADEMARK OFFICE
CERTIFICATE OF CORRECTION

PATENT NO. : 7,288,416 B2 Page 4 of 5
APPLICATION NO. : 10/851480
DATED : October 30, 2007
INVENTOR(S) : Uzawa et al.

It is certified that error appears in the above-identified patent and that said Letters Patent is hereby corrected as shown below:

Column 42, claim 2,

" 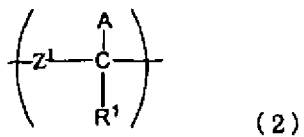 "

should be

-- 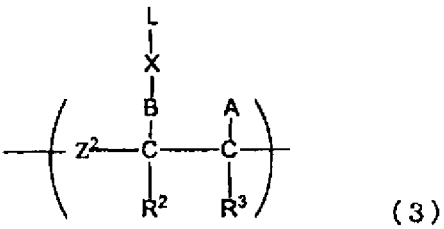 --

Column 42, claim 3,

" 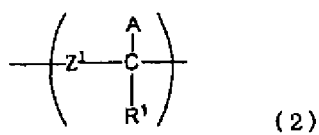 "

UNITED STATES PATENT AND TRADEMARK OFFICE
CERTIFICATE OF CORRECTION

| | |
|---|---|
| PATENT NO. | : 7,288,416 B2 |
| APPLICATION NO. | : 10/851480 |
| DATED | : October 30, 2007 |
| INVENTOR(S) | : Uzawa et al. |

It is certified that error appears in the above-identified patent and that said Letters Patent is hereby corrected as shown below:

should be

-- 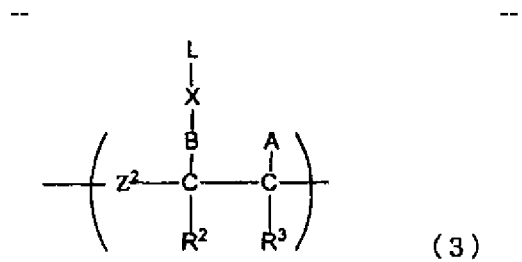 -- (3)

Signed and Sealed this

Twenty-first Day of October, 2008

JON W. DUDAS
*Director of the United States Patent and Trademark Office*